United States Patent
Abe

(10) Patent No.: US 9,742,199 B2
(45) Date of Patent: Aug. 22, 2017

(54) CONTACTLESS POWER SUPPLY SYSTEM AND CONTACTLESS EXTENSION PLUG

(71) Applicant: Panasonic Intellectual Property Management Co., Ltd., Osaka (JP)

(72) Inventor: Hideaki Abe, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 416 days.

(21) Appl. No.: 14/424,139

(22) PCT Filed: Aug. 19, 2013

(86) PCT No.: PCT/JP2013/004901
§ 371 (c)(1),
(2) Date: Feb. 26, 2015

(87) PCT Pub. No.: WO2014/038148
PCT Pub. Date: Mar. 13, 2014

(65) Prior Publication Data
US 2015/0214747 A1 Jul. 30, 2015

(30) Foreign Application Priority Data
Sep. 6, 2012 (JP) .................. 2012-196385

(51) Int. Cl.
*H01F 37/00* (2006.01)
*H01F 38/00* (2006.01)
(Continued)

(52) U.S. Cl.
CPC .............. *H02J 5/005* (2013.01); *H01F 38/14* (2013.01); *H02J 17/00* (2013.01)

(58) Field of Classification Search
CPC ............ H01F 38/14; H02J 5/005; H02J 17/00
(Continued)

(56) References Cited

U.S. PATENT DOCUMENTS

2011/0018359 A1  1/2011  Wada et al.
2012/0318586 A1  12/2012  Atarashi
(Continued)

FOREIGN PATENT DOCUMENTS

EP  2 320 538 A2  5/2011
EP  2 348 609 A2  7/2011
(Continued)

OTHER PUBLICATIONS

Extend European Search Report for corresponding European Application No. 13836062.3 dated Jan. 13, 2016.
(Continued)

*Primary Examiner* — Rexford Barnie
*Assistant Examiner* — Toan Vu
(74) *Attorney, Agent, or Firm* — Renner, Otto, Boisselle & Sklar, LLP

(57) ABSTRACT

A contactless power supply system includes a first power transmission coil, a plug power reception coil, a plug power transmission coil, and a first power reception coil. The first power transmission coil and the plug power reception coil are configured to satisfy a relational equation of $(L_{2a}/L_1)^{1/2}=G1/K1=N_{2a}/N_1$, where $L_1$ represents a self-inductance of the first power transmission coil, $L_{2a}$ represents a self-inductance of the plug power reception coil, $N_1$ represents a winding number of the first power transmission coil, $N_{2a}$ represents a winding number of the plug power reception coil, K1 represents a coupling coefficient of the first power transmission coil and the plug power reception coil, and G1 represents a voltage conversion gain of the voltage applied to the plug power transmission coil relative to the voltage applied to the first power transmission coil.

9 Claims, 13 Drawing Sheets

(51) Int. Cl.
*H02J 5/00* (2016.01)
*H01F 38/14* (2006.01)
*H02J 17/00* (2006.01)

(58) Field of Classification Search
USPC .......................................................... 307/104
See application file for complete search history.

(56) References Cited

U.S. PATENT DOCUMENTS

| | | | |
|---|---|---|---|
| 2013/0005408 A1 | 1/2013 | Matsui et al. | |
| 2014/0015327 A1* | 1/2014 | Keeling ................ | B60L 11/182 |
| | | | 307/104 |

FOREIGN PATENT DOCUMENTS

| | | |
|---|---|---|
| JP | 04-051505 A | 2/1992 |
| JP | 4135299 B2 | 6/2008 |
| JP | 4258505 B2 | 2/2009 |
| JP | 2009-189197 A | 8/2009 |
| JP | 2011-234051 A | 11/2011 |
| WO | WO 2011/108403 A1 | 9/2011 |
| WO | WO 2011/114527 A1 | 9/2011 |
| WO | WO 2011/135424 A1 | 11/2011 |

OTHER PUBLICATIONS

Japanese Office Action dated May 10, 2016 for corresponding Japanese Application No. 2014-534170.
Chinese Office Action dated Nov. 18, 2016 for corresponding Japanese Application No. 201380046194.2 and English translation.
Xiaoping Yao et al.; "Discussion on Novel Power Supply Technology"; The World of Power Supply, No. 12, Dec. 31, 2011 and partial English translation of Section 3.
International Preliminary Report on Patentability for corresponding International Application No. PCT/JP2013/004901 dated Mar. 10, 2015.
International Search Report for corresponding International Application No. PCT/JP2013/004901 dated Nov. 5, 2013.
Hiroshi Suga et al., "Zusetsu Denki Kairo Yoron", 1st edition, 7th print, Sangyo Tosho Kabushiki Kaisha, Mar. 25, 2011, pp. 157 to 169 and partial English translation.
Hidetoshi Matsuki et al., "Wireless Kyuden Gijutsu ga Wakaru Hon", 1st edition, 1st print, Ohmsha Ltd., Jul. 20, 2011, from line 17 of p. 48 to line 11 of p. 50 and partial English translation.

* cited by examiner

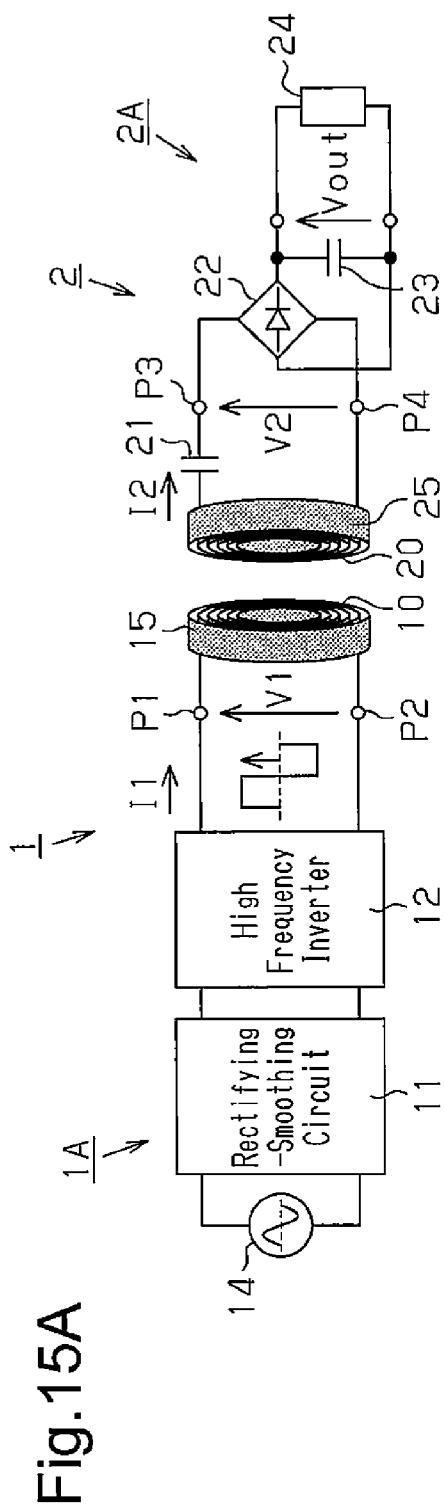
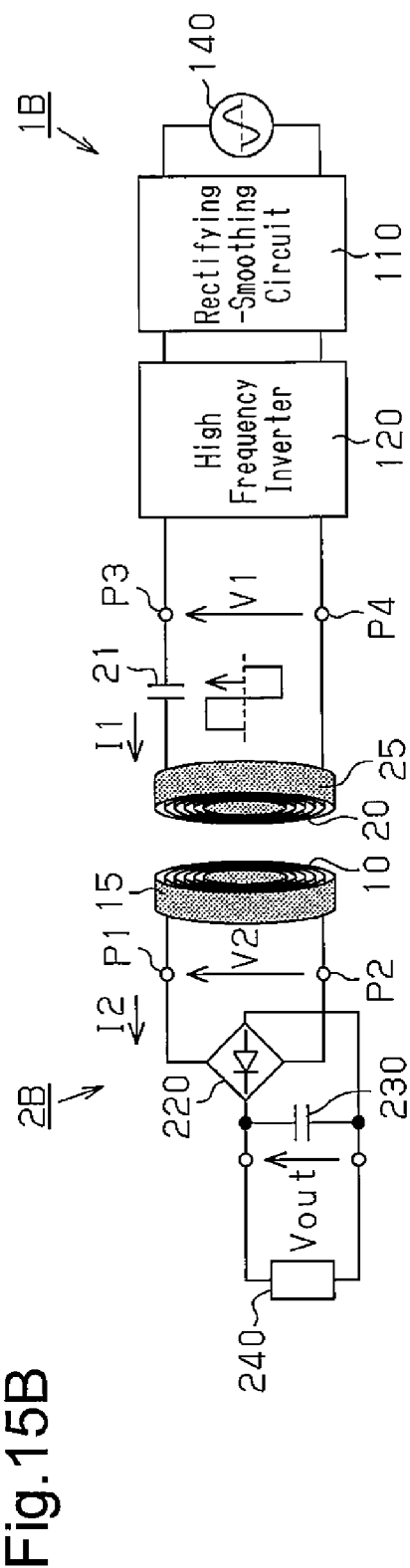
Fig.15A
Fig.15B

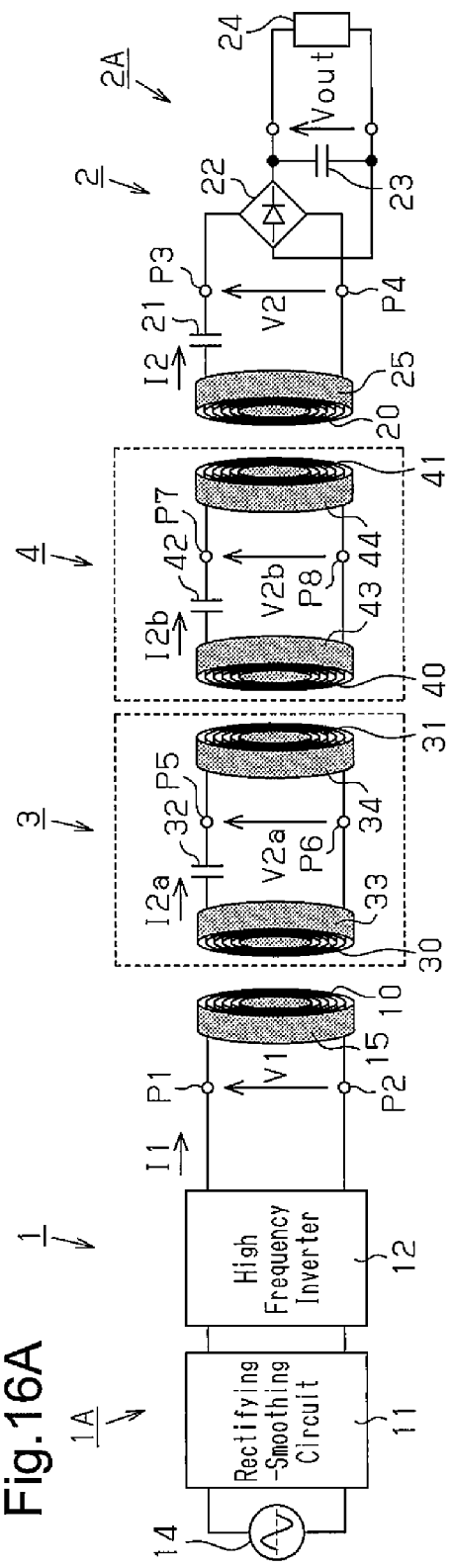
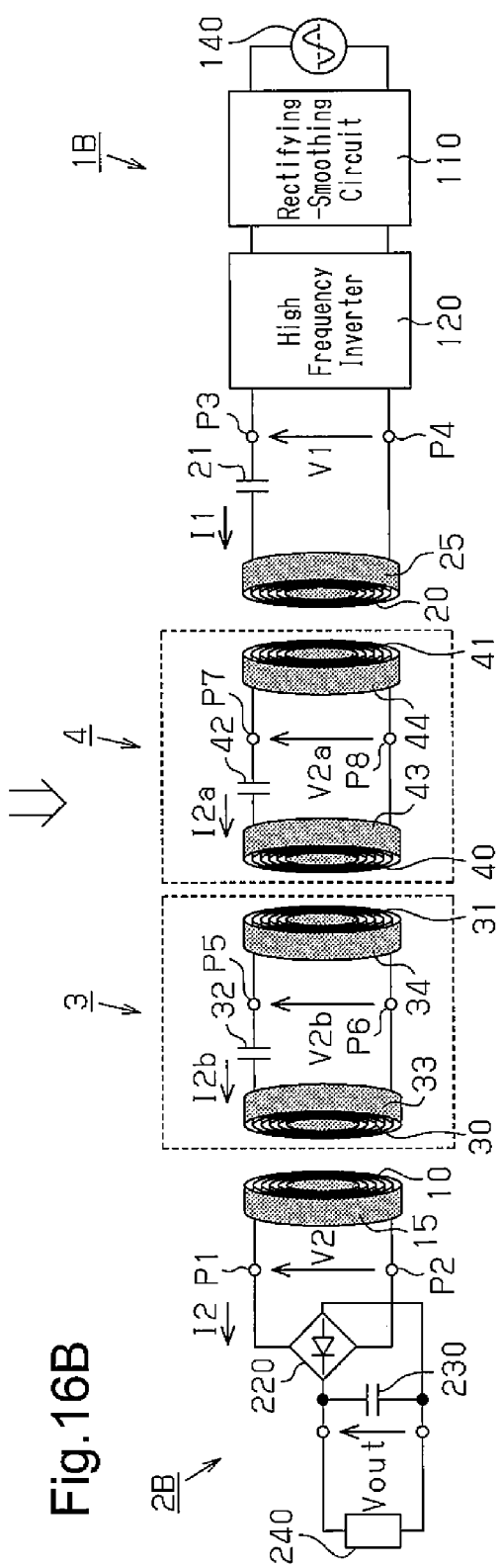
Fig.16A
Fig.16B

CONTACTLESS POWER SUPPLY SYSTEM AND CONTACTLESS EXTENSION PLUG

TECHNICAL FIELD

The present invention relates to a contactless power supply system and a contactless extension plug.

BACKGROUND ART

Generally, a contactless power supply system is formed by a power supplying device, which includes a power transmission coil, and a power receiving device, which includes a power reception coil. The power supplying device generates high frequency current and sends the high frequency current to the power transmission coil to generate an alternating magnetic field at the power transmission coil. The power receiving device interlinks the alternating magnetic field generated by the power transmission coil of the power supplying device with the power reception coil, which faces the power transmission coil, so that the power reception coil generates an induced electromotive force. The power receiving device rectifies the induced electromotive force generated by the power reception coil to generate direct current (DC) voltage and supply the DC voltage to a load or DC/AC converts the DC voltage and supplies alternating current (AC) voltage to the load.

Patent document 1 describes an example of the contactless power supply system that adapts a single power supplying device to a plurality of power receiving devices that generate different output voltages. The power supplying device includes a control means that controls the output voltage of each power receiving device to be within a predetermined voltage range throughout a region including a load region subject to each power receiving device.

As a specific means, patent document 1 describes the use of a resonance capacitor together with the power reception coil in the power receiving device to stop and start the supply of high frequency current to the power transmission coil of the power supplying device and control the output voltage.

Patent document 2 describes another example of the contactless power supply system that arranges a contactless extension plug between the power supplying device and the power receiving device. The contactless extension plug is configured by a closed circuit in which a power reception coil and a power transmission coil are connected in series by a resonance capacitor. The power reception coil of the contactless plug is arranged to face a primary coil of the power supplying device, and the power transmission coil of the contactless plug is arranged to face a secondary coil of the power receiving device.

The contactless extension plug allows power to be supplied to the power receiving device, which is spaced apart from the power supplying device, in a contactless manner. Furthermore, the contactless extension plug may also be used as a contactless voltage conversion plug to be applicable to an electrical appliance having a different load voltage.

Patent Document 1: Japanese Patent No. 4135299
Patent Document 2: Japanese Patent No. 4258505

SUMMARY OF THE INVENTION

However, in a contactless power supply system that adapts a single power supplying device to a plurality of power receiving devices that generate different output voltages like in patent document 1, when load voltage values greatly differ, there is a limit to the applicable range when control is performed only at the power supplying device side. In the prior art, the use of a stabilization power supply such as a DC-DC converter in combination with the power receiving device side has been suggested. However, a specific structure or design has not been proposed for a case in which the load requires minimized voltage fluctuation.

Patent document 2 discloses various forms of the contactless extension plug, but does not disclose a specific method or means for optimizing the transmission voltage and the conversion voltage. Therefore, there is a need for a structure and design condition of a contactless extension plug (contactless voltage conversion plug) that can realize the desired output voltage value.

Accordingly, it is an object of the present invention to provide a contactless power supply system that uses a magnetic coupling coil and a resonance capacitor in which the contactless power supply system easily generates load voltages used by various electric appliances with a single power supplying device.

It is also an object of the present invention to provide a contactless extension plug that is arranged between the power supplying device and the power receiving device and easily sets the output voltage of the contactless extension plug as required.

A first aspect is a contactless power supply system. The contactless power supply system includes a power supplying device and a power receiving device. The power supplying device includes a first high frequency inverter, which generates a high frequency current based on a first main power supply, and a first power transmission coil, which is supplied with the high frequency current. The power receiving device includes a first power reception coil, which interlinks with an alternating magnetic field formed by the first power transmission coil and generates an induced electromotive force, and a resonance capacitor, which is connected in series to the first power reception coil to produce series resonance. The power receiving device supplies power to a first load based on a secondary voltage generated by the series circuit of the first power reception coil and the resonance capacitor in accordance with a primary voltage applied to the first power transmission coil. The first power transmission coil and the first power reception coil are configured to satisfy a relational equation of $(L_2/L_1)^{1/2}=G/K$, where $L_1$ represents a self-inductance of the first power transmission coil, $L_2$ represents a self-inductance of the first power reception coil, K represents a coupling coefficient of the first power transmission coil and the first power reception coil, and G represents a voltage conversion gain of the secondary voltage relative to the primary voltage.

Preferably, in the above configuration, the first power transmission coil and the first power reception coil are identical with each other in same shape, structure, and size but not in winding number. An inverse number of a voltage conversion gain G and a coupling coefficient K expressed as G/K is set at a winding number ratio of a winding number of the first power transmission coil and a winding number of the first power reception coil.

Preferably, in the above configuration, the voltage conversion gain G is set to one.

Preferably, in the above configuration, the contactless power supply system includes at least one contactless extension plug arranged between the power supplying device and the power receiving device, and the contactless extension plug supplies power from the power supplying device to the power receiving device through electromagnetic induction.

Preferably, in this configuration, the contactless extension plug includes a plug power reception coil that interlinks with an alternating magnetic field formed by a power transmission coil of a preceding stage to generate an induced electromotive force, a plug resonance capacitor connected in series to the plug power reception coil to produces series resonance, and a plug power transmission coil connected to a series circuit of the plug power reception coil and the plug resonance capacitor. The plug power transmission coil generates an alternating magnetic field based on a voltage generated by the series circuit of the plug power reception coil and the plug resonance capacitor in accordance with voltage applied to the power transmission coil of the preceding stage, and a subsequent-stage power reception coil of a subsequent stage that intersects with the alternating magnetic field formed by the plug power transmission coil to generate an induced electromotive force is arranged in a subsequent stage of the plug power transmission coil. In this configuration, preferably, the power transmission coil of the preceding stage and the plug power reception coil are configured to satisfy a relational equation of $(L_{2a}/L_1)^{1/2}=G1/K1$, where $L_1$ represents a self-inductance of the power transmission coil of the preceding stage, $L_{2a}$ represents a self-inductance of the plug power reception coil, K1 represents a coupling coefficient of the power transmission coil of the preceding stage and the plug power reception coil, and G1 represents a voltage conversion gain of the voltage applied to the plug power transmission coil relative to the voltage applied to the power transmission coil of the preceding stage. Further, preferably, the plug power transmission coil and the power reception coil of the subsequent stage are configured to satisfy a relational equation of $(L_2/L_1)^{1/2}=G2/K2$, where $L_1$ represents a self-inductance of the plug power transmission coil, $L_2$ represents a self-inductance of the power reception coil of the subsequent stage, K2 represents a coupling coefficient of the power transmission coil of the subsequent stage and the plug power reception coil, and G2 represents a voltage conversion gain of the voltage applied to the plug power reception coil of the subsequent stage relative to the voltage applied to the plug power transmission coil.

Preferably, in the above configuration, the contactless power supply system includes at least one contactless extension plug arranged between the power supplying device and the power receiving device. The contactless extension plug supplies power from the power supplying device to the power receiving device through electromagnetic induction. In this configuration, preferably, the contactless extension plug includes a plug power reception coil that interlinks with an alternating magnetic field formed by a power transmission coil of a preceding stage to generate an induced electromotive force, and a plug power transmission coil connected to the plug power reception coil. The plug power transmission coil generates an alternating magnetic field based on a voltage generated by the plug power reception coil in accordance with a voltage applied to the power transmission coil of the preceding stage. A power reception coil of a subsequent stage that intersects with the alternating magnetic field formed by the plug power transmission coil to generate an induced electromotive force is arranged at a subsequent stage of the plug power transmission coil. In this configuration, preferably, the power transmission coil of the preceding stage and the plug power reception coil are configured to satisfy a relational equation of $(L_{2a}/L_1)^{1/2}=G1/K1$, where $L_1$ represents a self-inductance of the power transmission coil of the preceding stage, $L_{2a}$ represents a self-inductance of the plug power reception coil, K1 represents a coupling coefficient of the power transmission coil of the preceding stage and the plug power reception coil, and G1 represents a voltage conversion gain of the voltage applied to the plug power transmission coil relative to the voltage applied to the power transmission coil of the preceding stage. Further, preferably, the plug power transmission coil and the power reception coil of the subsequent stage are configured to satisfy a relational equation of $(L_2/L_{1a})^{1/2}=G2/K2$, where $L_{1a}$ represents a self-inductance of the plug power transmission coil, $L_2$ represents a self-inductance of the power reception coil of the subsequent stage, K2 represents a coupling coefficient of the power transmission coil of the subsequent stage and the plug power reception coil, and G2 represents a voltage conversion gain of the voltage applied to the plug power reception coil of the subsequent stage relative to the voltage applied to the plug power transmission coil.

Further, preferably, in the above configuration, the power transmission coil of the preceding stage and the plug power reception coil are identical with each other in shape, structure, and size but not in winding number. An inverse number of a voltage conversion gain G1 and a coupling coefficient K1 expressed by G1/K1 is set is set at a winding number ratio of a winding number of the power transmission coil of the preceding stage and a winding number of the plug power reception coil. Preferably, the plug power transmission coil and the power reception coil of the subsequent stage are identical with each other in shape, structure, and size nut not in winding number. Preferably, an inverse number of a voltage conversion gain G2 and a coupling coefficient K2 expressed by G2/K2 is set at a winding number ratio of a winding number of the plug power transmission coil and a winding number of the power reception coil of the subsequent stage.

A second aspect is a contactless power supply system. The contactless power supply system includes a power supplying device, a power receiving device, and a contactless extension plug arranged between the power supplying device and the power receiving device. The contactless extension plug supplies power from the power supplying device to the power receiving device through electromagnetic induction. The power supplying device includes a first high frequency inverter, which generates a high frequency current based on a first main power supply, and a first power transmission coil, which is supplied with the high frequency current. The contactless extension plug includes a plug power reception coil that interlinks with an alternating magnetic field formed by the first power transmission coil and generates an induced electromotive force, a plug resonance capacitor connected in series to the plug power reception coil to produce series resonance, and a plug power transmission coil connected to a series circuit of the plug power reception coil and the plug resonance capacitor. The power receiving device includes a first power reception coil that interlinks with an alternating magnetic field formed by the plug power transmission coil to generate an induced electromotive force, and the power receiving device supplies power to a first load based on a voltage generated by the first power reception coil in accordance with a voltage applied to the plug power transmission coil. The first power transmission coil and the plug power reception coil are configured to satisfy a relational equation of $(L_{2a}/L_1)^{1/2}=G1/K1$, where $L_1$ represents a self-inductance of the first power transmission coil, $L_{2a}$ represents a self-inductance of the plug power reception coil, K1 represents a coupling coefficient of the first power transmission coil and the plug power reception coil, and G1 represents a voltage conversion gain of the voltage applied to the plug power transmission coil relative to the voltage applied to the first power transmission coil. The plug power transmission coil and the first power reception coil are configured to satisfy a relational equation of $(L_2/L_{1a})^{1/2}=G2/K2$, where $L_{1a}$ represents a self-inductance of the plug power transmission coil, $L_2$ represents a self-inductance of the first power reception coil, K2 represents a coupling coefficient of the plug power transmission coil and the plug power reception coil, and G2 represents a voltage conversion gain of the voltage applied to the first power reception coil relative to the voltage applied to the plug power transmission coil.

In the first and second aspects, preferably, the contactless power supply system further includes a second high frequency inverter that generates a high frequency current based on a second main power supply. In this configuration, preferably, the first power reception coil is selectively connectable to either one of the second high frequency inverter and the first load, and the first power transmission coil is selectively connectable to either one of the first high frequency inverter and a second load. When the first power reception coil is connected to the second high frequency inverter and the first power transmission coil is connected to the second load, the first power reception coil functions as a second power transmission coil and the first power transmission coil functions as a second power reception coil.

A third aspect is a contactless extension plug that supplies power from a power transmission coil of a preceding stage to a power reception coil of a subsequent stage. The contactless extension plug includes a plug power reception coil arranged facing the power transmission coil of the preceding stage, a plug power transmission coil arranged facing the power reception coil of the subsequent stage, and a resonance capacitor connected in series between the plug power reception coil and the plug power transmission coil to configure a closed circuit. The plug power reception coil interlinks with an alternating magnetic field formed by the power transmission coil of the preceding stage to generate an induced electromotive force. The plug power transmission coil forms an alternating magnetic field based on the induced electromotive force generated by the plug power reception coil, and the power reception coil of the subsequent stage interlinks with the alternating magnetic field formed by the plug power transmission coil to generate an induced electromotive force. The power transmission coil of the preceding stage and the plug power reception coil are configured to satisfy a relational equation of $(L_{2a}/L_1)^{1/2}=G1/K1$, where $L_1$ represents a self-inductance of the power transmission coil of the preceding stage, $L_{2a}$ represents a self-inductance of the plug power reception coil, K1 represents a coupling coefficient of the power transmission coil of the preceding stage and the plug power reception coil, and G1 represents a voltage conversion gain of the voltage applied to the plug power transmission coil relative to the voltage applied to the power transmission coil of the preceding stage. The plug power transmission coil and the power reception coil of the subsequent stage are configured to satisfy a relational equation of $(L_2/L_{1a})^{1/2}=G2/K2$, where $L_{1a}$ represents a self-inductance of the plug power transmission coil, $L_2$ represents a self-inductance of the power reception coil of the subsequent stage, K2 represents a coupling coefficient of the plug power transmission coil and the power reception coil of the subsequent stage, and G2 represents a voltage conversion gain of the voltage applied to the power reception coil of the subsequent stage relative to the voltage applied to the plug power transmission coil.

A fourth aspect is a contactless extension plug that supplies power from a power transmission coil of a preceding stage to a power reception coil of a subsequent stage. The contactless extension plug includes a plug power reception coil arranged facing the power transmission coil of the preceding stage, and a plug power transmission coil arranged facing the power reception coil of the subsequent stage. The plug power reception coil interlinks with an alternating magnetic field formed by the power transmission coil of the preceding stage to generate an induced electromotive force. The plug power transmission coil forms an alternating magnetic field based on the induced electromotive force generated by the plug power reception coil. The power reception coil of the subsequent stage interlinks with the alternating magnetic field formed by the plug power transmission coil to generate an induced electromotive force. At least either one of the power transmission coil of the preceding stage and the power reception coil of the subsequent stage is connected in series to a resonance capacitor. The power transmission coil of the preceding stage and the plug power reception coil are configured to satisfy a relational equation of $(L_{2a}/L_1)^{1/2}=G1/K1$, where $L_1$ represents a self-inductance of the power transmission coil of the preceding stage, $L_{2a}$ represents a self-inductance of the plug power reception coil, K1 represents a coupling coefficient of the power transmission coil of the preceding stage and the plug power reception coil, and G1 represents a voltage conversion gain of a voltage applied to the plug power transmission coil relative to the voltage applied to the power transmission coil of the preceding stage. The plug power transmission coil and the power reception coil of the subsequent stage are configured to satisfy a relational equation of $(L_2/L_{1a})^{1/2}=G2/K2$, where $L_{1a}$ represents a self-inductance of the plug power transmission coil, $L_2$ represents a self-inductance of the power reception coil of the subsequent stage, K2 represents a coupling coefficient of the plug power transmission coil and the power reception coil of the subsequent stage, and G2 represents a voltage conversion gain of the voltage applied to the power reception coil of the subsequent stage relative to the voltage applied to the plug power transmission coil.

In the above configuration, preferably, the power transmission coil of the preceding stage and the plug power reception coil are identical to each other in shape, structure, and size but not in winding number, and an inverse number of the voltage conversion gain G1 and the coupling coefficient K1 expressed by G1/K1 is set at a winding number ratio of a winding number of the power transmission coil of the preceding stage and a winding number of the plug power reception coil. Further, preferably, the plug power transmission coil and the power reception coil of the subsequent stage are identical to each other in shape, structure, and size but not in winding number, and an inverse number of the voltage conversion gain G2 and the coupling coefficient K2 expressed by G2/K2 is set at a winding number ratio of a winding number of the plug power transmission coil and a winding number of the power reception coil of the subsequent stage.

In the above configuration, preferably, the voltage conversion gain G1 is set to one.

In the above configuration, the power transmission coil of the preceding stage may be a power transmission coil of a power supplying device. In this configuration, preferably, a high frequency current generated by a high frequency inverter of the power supplying device based on power from a main power supply is supplied to the power transmission coil of the power supplying device.

In the above configuration, the power reception coil of the subsequent stage may be a power reception coil of a power receiving device. In this configuration, preferably, the power reception coil of the power receiving device interlinks with an alternating magnetic field formed by the plug power transmission coil to generate an induced electromotive force, and an output voltage is supplied to a load based on the induced electromotive force generated by the power reception coil.

Further, in the above configuration, the plug power reception coil and the plug power transmission coil may be accommodated in different housings. In this case, the plug power reception coil and the plug power transmission coil are arranged spaced apart by way of a connecting wire.

In the above configuration, the plug power reception coil and the plug power transmission coil may be accommodated in the same housing. In this case, the plug power reception coil and the plug power transmission coil are arranged at positions proximate to each other.

Effect of the Invention

In a contactless power supplying system using a magnetic coupling coil and a resonance capacitor, the present invention easily generates load voltages used by various electric appliances with a single power supplying device.

BRIEF DESCRIPTION OF THE DRAWINGS

FIGS. 15A and 15B are electrical circuit diagrams illustrating an example of a bidirectional contactless power supply system.

FIGS. 16A and 16B are electrical circuit diagrams illustrating another example of the bidirectional contactless power supply system.

DESCRIPTION OF THE EMBODIMENTS

First Embodiment

A contactless power supply system of a first embodiment will be hereinafter described according to the drawings.

Figure 1:
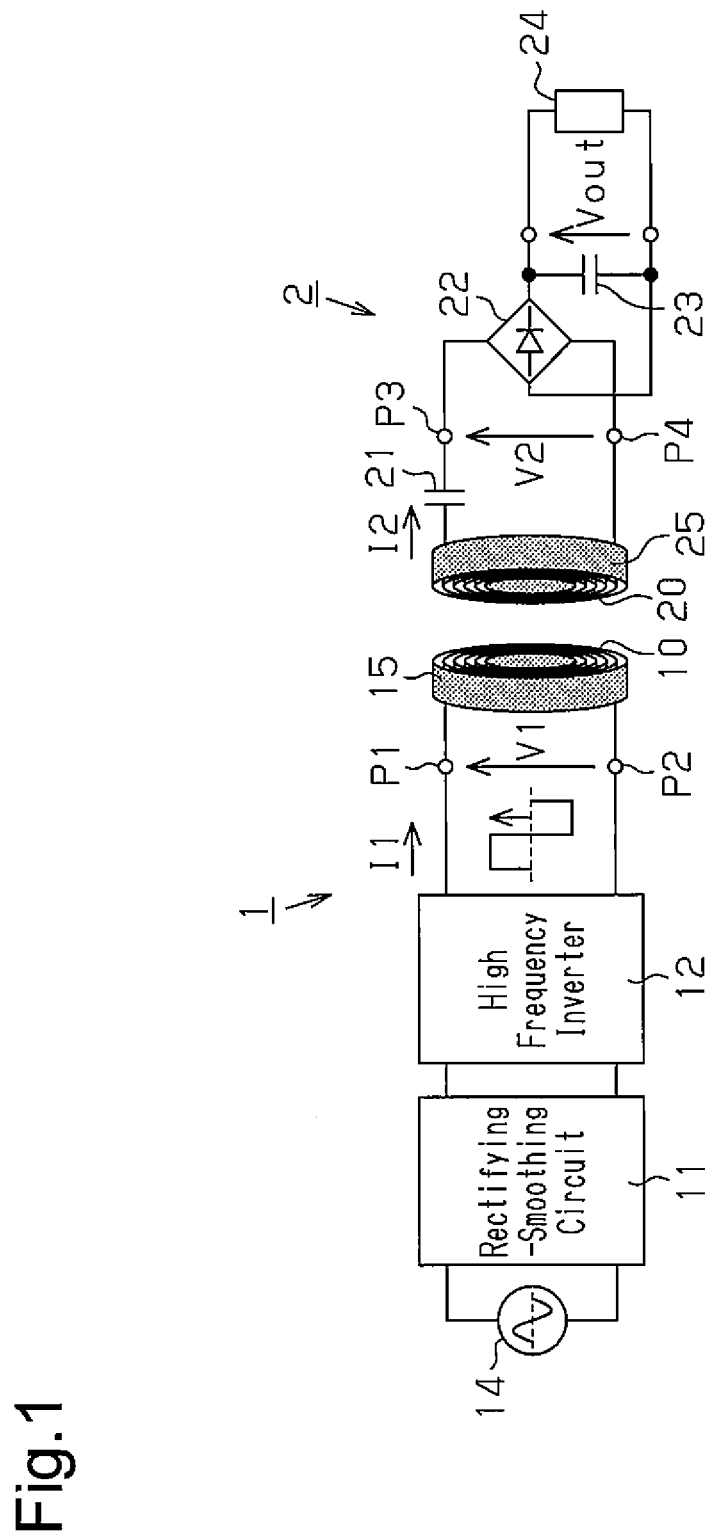
FIG. 1 is an electrical circuit diagram illustrating a first embodiment of a contactless power supply system.

FIG. 1 is a diagram showing a schematic electrical circuit diagram of a contactless power supply system. In FIG. 1, the contactless power supply system includes a power supplying device 1, and a power receiving device 2 serving as an electrical appliance.

The power supplying device 1 includes a power transmission coil 10, a rectifying-smoothing circuit 11, and a high frequency inverter 12. The rectifying-smoothing circuit 11, which includes a full-wave rectifying circuit and a smoothing capacitor, rectifies a commercial AC power supply 14 to a DC voltage with the full-wave rectifying circuit, smoothens the DC voltage with the smoothing capacitor, and outputs the DC voltage to the high frequency inverter 12.

The high frequency inverter 12 is a known half-bridge type or a full-bridge type inverter, for example, and generates a high frequency voltage (primary voltage $V_1$) based on the DC voltage from the rectifying-smoothing circuit 11. The high frequency inverter 12 applies the high frequency voltage (primary voltage $V_1$) between input terminals P1, P2 of the power transmission coil 10. A high frequency current (primary current $I_1$) is thus supplied to the power transmission coil 10.

The power transmission coil 10 is wound around a first pot type core 15, and generates an alternating magnetic field when the high frequency current (primary current $I_1$) from the high frequency inverter 12 is supplied.

The power receiving device 2 includes a power reception coil 20, a resonance capacitor 21, a full-wave rectifying circuit 22, a smoothing capacitor 23, and a load 24.

The power reception coil 20 is arranged to face and magnetically couple to the power transmission coil 10 of the power supplying device 1 to interlink with the alternating magnetic field formed by the power transmission coil 10 and generate an induced electromotive force.

The power transmission coil 20 is wound around a second pot type core 25, which has the same shape and is made of the same material as the first pot type core 15. The power transmission coil 20 is connected in series to the resonance capacitor 21 to configure a series circuit, and outputs an induced electromotive force (secondary voltage $V_2$) generated in the power reception coil 20 from output terminals P3, P4 of the series circuit.

The resonance capacitor 21 is arranged for impedance matching to output a constant output voltage Vout to the load 24 regardless of the size of the load 24, and is set to a capacitance Cx, which will be described later.

The series circuit of the power reception coil 20 and the resonance capacitor 21 is connected to the full-wave rectifying circuit 22. The full-wave rectifying circuit 22 full-wave rectifies the induced electromotive force (secondary voltage $V_2$) generated by the power reception coil 20. The induced electromotive force (secondary voltage $V_2$) rectified by the full-wave rectifying circuit 22 is smoothed by the smoothing capacitor 23 and output to the load 24 as an output voltage Vout.

A method for designing each circuit element of the contactless power supply system will now be described.

Figure 2:
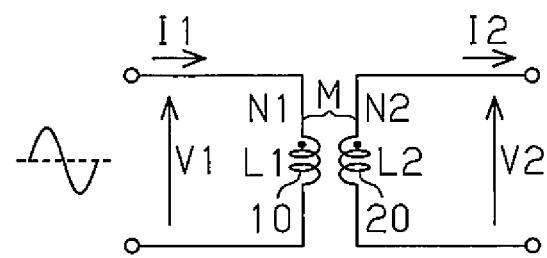
FIG. 2 is an equivalent circuit diagram of a main portion of an electrical circuit in the contactless system of FIG. 1.

FIG. 2 shows an equivalent circuit of the power transmission coil 10 of the power supplying device 1 and the power reception coil 20 of the power receiving device 2 extracted from FIG. 1.

The high frequency current (primary current $I_1$) based on the high frequency voltage (primary voltage $V_1$) from the high frequency inverter 12 flows to the power transmission coil 10. The induced electromotive force (secondary voltage $V_2$) is generated and the secondary current $I_2$ flows to the power reception coil 20.

In this case, a relational equation shown in the following equations (1) and (2) is satisfied.

$$V_1 = L_1 \cdot \frac{dI_1}{dt} - M \cdot \frac{dI_2}{dt} \quad (1)$$

$$V_2 = -L_2 \cdot \frac{dI_2}{dt} + M \cdot \frac{dI_1}{dt} \quad (2)$$

Here, $L_1$ represents a self-inductance of the power transmission coil 10, and $L_2$ represents a self-inductance of the power reception coil 20.

M represents a mutual inductance, and a relational relationship shown in the following equation (3) is satisfied, where K represents a coupling coefficient.

$$K = \frac{M}{\sqrt{L_1 \cdot L_2}} \quad (3)$$

Equation (2) is transformed to a function of the secondary current $I_2$ as in the following equation (4) using equation (1).

$$V_2 = V_1 \cdot \frac{M}{L_1} - \left(L_2 - \frac{M^2}{L_1}\right) \cdot \frac{dI_2}{dt} \quad (4)$$

Equation (4) is an input/output relational equation of the equivalent circuit of a secondary side conversion.

Equation (4) is substituted to the following equation (5).

$$V_2 = E_2 - L_x \cdot \frac{dI_2}{dt} \quad (5)$$

Here, $E_2$ of the first term in equation (5) is expressed with the following equation (6), and Lx of the second term is expressed with the following equation (7).

$$E_2 = V_1 \cdot \frac{M}{L_1} \quad (6)$$

$$L_x = L_2 - \frac{M^2}{L_1} \quad (7)$$

Figure 3:
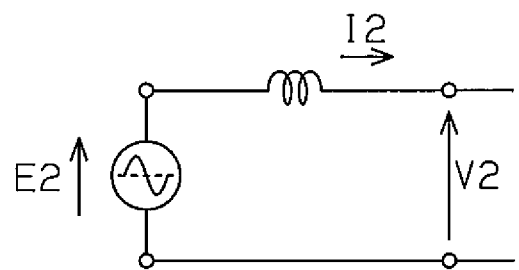
FIG. 3 is an equivalent circuit diagram of a secondary side conversion in the contactless system of FIG. 1.

FIG. 3 shows an equivalent circuit of the secondary side conversion when the side of the power transmission coil 10 is viewed from the power reception coil 20 side based on equation (7).

As shown in equation (6), $E_2$ represents a function of a ratio of the mutual inductance M and the self-inductance $L_1$ of the power transmission coil 10 and the primary voltage $V_1$ applied to the power transmission coil 10. Therefore, if the primary voltage $V_1$ is known, $E_2$ can be independently determined as a voltage source that does not depend on the load and the output circuit.

As shown in equation (7), Lx represents a function of the self-inductances $L_1$, $L_2$ and the mutual inductance M, and indicates a secondary converted secondary leakage inductance. That is, the secondary leakage inductance Lx becomes an induced reactance. Therefore, it is apparent that when the current flows to the power reception coil 20 in the high frequency operation, a voltage drop always occurs in the power reception coil 20.

The components of $E_2$ of equation (6) and Lx of equation (7) are then substituted with the coupling coefficient K to be expressed with the relational equations shown in the following equations (8), (9).

$$E_2 = V_1 \cdot K \cdot \sqrt{\frac{L_2}{L_1}} \quad (8)$$

$$L_x = L_2 \cdot (1 - K^2) \quad (9)$$

As a result, equation (5) can be expressed as shown in the following equation (10) using the equations (8), (9).

$$V_2 = V_1 \cdot K \cdot \sqrt{\frac{L_2}{L_1}} - L_2 \cdot (1 - K^2) \cdot \frac{dI_2}{dt} \quad (10)$$

Equation (10) is important in the contactless power supply system in which the coupling coefficient K becomes a large element.

That is, as apparent from equation (10), it can be understood that $E_2 (=V_1 \cdot K \cdot (L_2/L_1)^{1/2})$ is proportional to the coupling coefficient K. This means that if the coupling coefficient K is small, $E_2$ becomes small in proportion thereto.

Therefore, for example, if the coupling coefficient is K=0.1, $E_2$ decreases to 1/10 of when close coupling occurs. If the coupling coefficient is K=0.01, $E_2$ decreases to 1/100 of when close coupling occurs. Thus, it can be understood that $E_2$ becomes extremely small.

The secondary leakage inductance $Lx(=L_2 \cdot (1-K^2))$ becomes a numerical value obtained by multiplying $(1-K^2)$ by the self-inductance $L_2$ of the power reception coil 20.

Therefore, for example, if the coupling coefficient K is K=0.7, Lx is the magnitude of $Lx=0.51 \times L_2$ and becomes about one half the leakage inductance. If the coupling coefficient K is K=0.5, the secondary leakage inductance Lx is $Lx=0.75 \times L_2$, and is a ¾ inductance. Furthermore, if the coupling coefficient K is K=0.1, the secondary leakage inductance Lx is $Lx=0.99 \times L_2$ and substantially the same value as the self-inductance $L_2$ of the power reception coil 20. Even if the coupling coefficient K becomes smaller, the secondary leakage inductance Lx substantially remains at the self-inductance $L_2$.

In other words, a region in which the secondary leakage inductance Lx changes with respect to the change of the coupling coefficient K and a region (i.e., region in which Lx substantially does not change) in which the secondary leakage inductance Lx becomes $(Lx \approx L_2)$ are roughly obtained and both regions need to be taken into consideration in the contactless power supply system.

In the contactless power supply system, the DC current is generated through the full-wave rectifying circuit 22 and the smoothing capacitor 23 regardless of the size of the load 24 in the power receiving device 2, and a constant output voltage Vout is desirably supplied with respect to the load 24.

However, as described above, the secondary leakage inductance Lx that becomes the induced reactance exists in the contactless power supply system, and the current flows to the power reception coil 20 causing a voltage drop in the high frequency operation.

Thus, in the present embodiment, the resonance capacitor 21 is connected in series to the power reception coil 20. The resonance capacitor 21 cancels the secondary leakage inductance Lx, which is the induced reactance, with the capacitive reactance of the resonance capacitor 21 so that line impedance is assumed to be substantially zero. As a result, the substantially constant load current (secondary current $I_2$), that is, a substantially constant output voltage Vout that does not depend on the size of the load 24 is obtained.

The capacitance Cx of the resonance capacitor 21 is obtained with the following equation (12) by transforming a series resonance conditional equation of the following equation (11). Here, f is the drive frequency of the primary voltage $V_1$.

$$f = \frac{1}{2 \cdot \pi \sqrt{L_x \cdot C_x}} \quad (11)$$

$$C_x = \frac{1}{(2 \cdot \pi \cdot f)^2 \cdot L_x} \quad (12)$$

The secondary voltage ($V_2 \approx E_2$) that does not depend on the load 24 is obtained by connecting the resonance capacitor 21 having the capacitance Cx to the power reception coil 20 in series. In this case, the relational equation of $V_2=E_2=V_{out}$ is obtained if the voltage drop of the full-wave rectifying circuit 22 is ignored.

In other words, a relational equation represented with the following equation (13) is satisfied.

$$V_2 = E_2 = V_{out} = V_1 \cdot \sqrt{\frac{M}{L_1}} = V_1 \cdot K \cdot \sqrt{\frac{L_2}{L_1}} \quad (13)$$

Here, by defining a gain of an amplitude of the secondary voltage $V_2$ with respect to an amplitude of the primary voltage $V_1$ as $G=V_2/V_1$, equation (13) can be organized to equation (14), and the gain G can be transformed to equation (15).

$$E_2 = V_2 = V_1 \cdot G = V_1 \cdot K \cdot \sqrt{\frac{L_2}{L_1}} \quad (14)$$

$$G = K \cdot \sqrt{\frac{L_2}{L_1}} \quad (15)$$

The coupling coefficient K is a concept corresponding to the proportion of the magnetic flux interlinking the power reception coil 20 of the magnetic flux generated in the power transmission coil 10. Therefore, if the specifications such as the structure, the shape, the size, and the like of the power transmission coil 10 and the power reception coil 20 are determined regardless of the number of windings of the coil, the coupling coefficient K is determined by the relative positional relationship thereof. The coupling coefficient K can be easily measured in advance.

Thus, the self-inductances $L_1$, $L_2$ of the power transmission coil and the power reception coil 10, 20 are set to satisfy equation (16) transformed from equation (15).

$$\sqrt{\frac{L_2}{L_1}} = \frac{G}{K} \quad (16)$$

Therefore, in the present embodiment, if the measurement result of the coupling coefficient K is K=0.5, $(L_2/L_1)^{1/2}$ is set to four, that is, $(L_2/L_1)$ is set to 16 to set the gain G to G=2. If the coupling coefficient K is K=0.5, $(L_2/L_1)^{1/2}$ is set to two, that is, $(L_2/L_1)$ is set to four to set the gain G to G=1.

The self-inductances $L_1$, $L_2$ of the power transmission and power reception coils 10, 20 based on equation (16) are the setting of electrical parameters. Thus, the setting of the power transmission coil 10 and the power reception coil 20 with respect to the realistic gain G is easier, more reliable, and more realistic.

When the winding number of the power transmission coil 10 is represented by $N_1$ and the magnetic resistance of the surrounding space as viewed from the power transmission coil 10 is represented by Rm1, the inductance $L_1$ of the power transmission coil 10 is expressed by the following relational equation (17).

In the same manner, when the winding number of the power reception coil 20 is represented by $N_2$ and the magnetic resistance of the surrounding space as viewed from the power reception coil 20 is represented by Rm2, the inductance $L_2$ of the power reception coil 20 is expressed by the following relational equation (18).

$$L_1 \propto \frac{N_1^2}{Rm_1} \quad (17)$$

$$L_2 \propto \frac{N_2^2}{Rm_2} \quad (18)$$

That is, the inductances $L_1$, $L_2$ of the power transmission and power reception coils 10, 20 are respectively inversely proportional to the magnetic resistances Rm1, Rm2, and are proportional to the square of the winding numbers $N_1$, $N_2$.

In this case, the magnetic resistances Rm1, Rm2 can be determined by the structure, the shape, the size, the material condition of the coils 10, 20, the positional relationship of the two coils, and the like rather than the winding numbers $N_1$, $N_2$ of the coils 10, 20. Therefore, if the first pot type core 15, around which the power transmission coil 10 is wound, and the second pot type core 25, around which the power reception coil 20 is wound, have the same specifications and are arranged facing each other, the magnetic resistances Rm1, Rm2 are the same.

That is, when the coupling coefficient K is the same, only the inductances $L_1$, $L_2$ can be changed by changing the winding numbers $N_1$, $N_2$ with the magnetic resistances Rm1, Rm2 of the power transmission coil 10 and the power reception coil 20 under the same condition.

Therefore, when expressing a winding number ratio a of the power transmission coil 10 and the power reception coil 20 with the following equation (19), the previous equations (14) and (15) can be expanded to the following equations (20) and (21). Furthermore, equation (19) is represented with equation (22).

$$a = \frac{N_1}{N_2} \quad (19)$$

$$E_2 = V_2 = V_1 \cdot G = V_1 \cdot K \cdot \sqrt{\frac{L_2}{L_1}} \propto V_1 \cdot K \cdot \frac{N_2}{N_1} = V_1 \cdot K \cdot \frac{1}{a} \quad (20)$$

$$G = \frac{M}{L_1} = K \cdot \sqrt{\frac{M}{L_1}} = K \cdot \frac{1}{a} \quad (21)$$

$$a = \frac{K}{G} \quad (22)$$

Therefore, in the power transmission and power reception coils 10, 20, when the specification is the same or can be assumed to be the same except for the winding numbers $N_1$, $N_2$, the winding numbers $N_1$, $N_2$ of the two coils 10, 20 only need to be set, as apparent from equation (22), to set the desired gain G.

In other words, the structure, the shape, and the size of the power transmission and the power reception coils 10, 20 are determined such that the magnetic resistance generated by the power transmission coil 10 and the magnetic resistance generated by the power reception coil 20 become the same. The power transmission and power reception coils 10, 20 have the same structure, shape, and size with each other. The material conditions of the power transmission and the power reception coils 10, 20 are also preferably the same.

Therefore, in the present embodiment, for example, when the coupling coefficient K is K=0.5 and the gain G is G=2, the winding number ratio a(=$N_1/N_2$) becomes a=¼.

As a result, the winding number $N_1$ of the power transmission coil 10 is set to 100 turns, and the winding number $N_2$ of the power reception coil 20 is set to 400 turns, for example, to obtain such winding number ratio a. Alternatively, the winding number $N_1$ of the power transmission coil 10 is set to 10 turns, and the winding number $N_2$ of the power reception coil 20 is set to 40 turns. The large and small of the winding numbers $N_1$, $N_2$ is optimized in accordance with the design specification.

If the gain G is G=1, the winding number ratio a matches the coupling coefficient K (a=K).

Therefore, in the present embodiment, for example, when the gain G is G=1, the winding number ratio a becomes a=0.5 if the coupling coefficient K is K=0.5, and thus the winding number $N_1$ is set to 100 turns and the winding number $N_2$ is set to 200 turns, for example.

The first embodiment has the following advantages.

(1) The shape, the structure, and the size of the power transmission coil 10 and the power reception coil 20 are made the same, and the coupling coefficient K of the power transmission coil 10 and the power reception coil 20 is measured in advance or is theoretically obtained.

Thus, the coils 10, 20 are set so that equation (16) is satisfied between the self-inductances $L_1$, $L_2$ of the power transmission and power reception coils 10, 20 and the gain G. It was found that a=K/G shown in equation (22) is satisfied between the winding number ratio a and the gain G.

As a result, when supplying the output voltage Vout amplified with the desired gain G with respect to the primary voltage $V_1$ applied to the power transmission coil 10 of the power supplying device 1 to the load 24 of the power receiving device 2, the value of the output voltage Vout is determined with the winding number ratio a, that is, the winding number $N_1$ and the winding number $N_2$.

That is, the desired output voltage Vout is easily set with the winding number $N_1$ and the winding number $N_2$.

(2) Since the desired output voltage Vout is output by setting only the winding numbers $N_1$, $N_2$, different stable output voltages Vout are output by changing the winding number $N_2$ of the power reception coil 20 with respect to one power supplying device 1 (power transmission coil 10).

In other words, the same power supplying device 1 (power transmission coil 10) is applicable to plural types of power receiving devices requiring different stable output voltages Vout.

That is, even if the plurality of power receiving devices requires different stable output voltages Vout, the same power supplying device 1 (power transmission coil 10) can be used by simply setting the winding number $N_2$ of the respective power reception coil 20 in accordance with the required output voltage Vout.

Therefore, the same power supplying device 1 (power transmission coil 10) is applicable to a plurality of types of power receiving devices in which the winding number $N_2$ of the power reception coil 20 are different and the required stable output voltage Vout are different.

(3) The use of a stabilization power supply circuit such as a DC-DC converter or the like at the preceding stage of the load 24 enables application to the load 24, in which the voltage fluctuation needs to be extremely small.

Second Embodiment

A second embodiment of a contactless power supply system will now be described.

Figure 4:
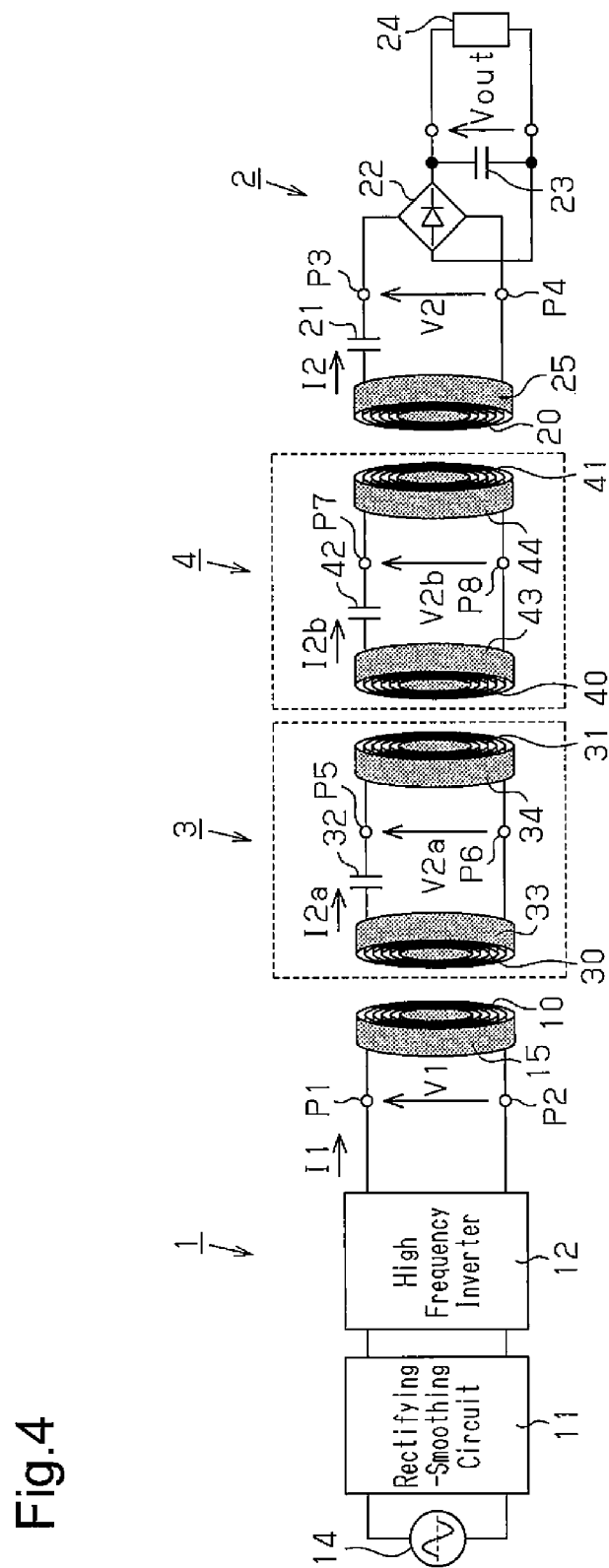
FIG. 4 is an electrical circuit diagram illustrating a second embodiment of a contactless power supply system.

In the contactless power supply system of the second embodiment shown in FIG. 4, two contactless extension plugs, that is, a first contactless extension plug 3 and a second contactless extension plug 4 are located between the power supplying device 1 and the power receiving device 2 described in the first embodiment.

The first contactless extension plug 3 includes a first plug power reception coil 30, a first plug power transmission coil 31, and a first plug resonance capacitor 32.

The first plug power reception coil 30 is arranged to face the power transmission coil 10 of the power supplying device 1 so as to be magnetically coupled thereto, and interlinks with the alternating magnetic field generated by the power transmission coil 10 and outputs the induced electromotive force. The first plug power reception coil 30 is wound around a third pot type core 33 having the same shape and made of the same material as the first pot type core 15 around which the power transmission coil 10 of the power supplying device 1 is wound. That is, the structure, the shape, and the size of the coils 10, 30 are set to be the same so that the magnetic resistance generated by the power transmission coil 10 and the magnetic resistance generated by the first plug power reception coil 30 are the same. The material conditions of the coils 10, 30 may also be the same.

The first plug resonance capacitor 32 is connected in series to the first plug power reception coil 30 to configure a series circuit. The first plug power transmission coil 31 is connected to output terminals P5, P6 of the series circuit. The first plug resonance capacitor 32 cancels the secondary leakage inductance Lxa (see FIG. 6), which is the induced reactance similar to the first embodiment. The capacitance Cxa of the first plug resonance capacitor 32 is obtained in accordance with equation (12) in the same manner as the first embodiment.

Therefore, the first plug power reception coil 30 interlinks with the alternating magnetic field of the power transmission coil 10 of the power supplying device 1 to output the induced electromotive force (secondary voltage $V_{2a}$) to the output terminals P5, P6. The induced electromotive force is applied to the first plug power transmission coil 31.

In this case, the first plug power reception coil 30 of the first contactless extension plug 3 is formed to be identical in shape, structure, and size as the power transmission coil 10 of the power supplying device 1 but not in winding number $N_{2a}$. In other words, the magnetic resistance generated by the power transmission coil 10 and the magnetic resistance generated by the first plug power reception coil 30 are the same. A coupling coefficient K1 of the power transmission coil 10 and the first plug power reception coil 30 is, for example, obtained through measurements performed in advance.

The winding number $N_{2a}$ of the first plug power reception coil 30 is adjusted with respect to the winding number $N_1$ of the power transmission coil 10 of the power supplying device 1. That is, a gain G1 of the first contactless extension plug 3 is determined by adjusting the winding number $N_{2a}$ of the first plug power reception coil 30.

Thus, the gain G1 is set in advance, and the winding number $N_{2a}$ of the first plug power reception coil 30 is obtained based on $N_1/N_{2a}=K1/G1$ (see equation (22)). This outputs the desired secondary voltage $V_{2a}(V_{2a}=G1\cdot V_1)$ from the output terminals P5, P6 to the first plug power transmission coil 31.

The first plug power transmission coil 31 is wound around a fourth pot type core 34 having the same shape and made of the same material as the third pot type core 33 around which the first plug power reception coil 30 is wound. The first plug power transmission coil 31 generates an alternating magnetic field by supplying a secondary current $I_{2a}$ based on the secondary voltage $V_{2a}(=G1\cdot V_1)$. The frequency of such alternating magnetic field is the same as the frequency f of the alternating magnetic field generated by the power transmission coil 10 of the power supplying device 1.

The second contactless extension plug 4 includes a second plug power reception coil 40, a second plug power transmission coil 41, and a second plug resonance capacitor 42.

The second plug power reception coil 40 is arranged to face the first plug power transmission coil 31 so as to be magnetically coupled thereto, and interlinks with the alternating magnetic field generated by the first plug power transmission oil 31 and outputs the induced electromotive force. The second plug power reception coil 40 is wound around a fifth pot type core 43 having the same shape and made of the same material as the fourth pot type core 34 around which the first plug power transmission coil 31 of the first contactless extension plug 3 is wound. That is, the structure, the shape, and the size of the coils 31, 40 are the same so that the magnetic resistance generated by the first plug power transmission coil 31 and the magnetic resistance generated by the second plug power reception coil 40 become the same. The material conditions of the coils 31, 40 may also be the same.

The second plug resonance capacitor 42 is connected in series to the second plug power reception coil 40 to configure a series circuit. The second plug power transmission coil 41 is connected to output terminals P7, P8 of the series circuit. The second plug resonance capacitor 42 cancels the secondary leakage inductance Lxb (see FIG. 6), which is the induced reactance similar to the first embodiment. The capacitance Cxb of the second plug resonance capacitor 42 is obtained according to equation (12) similar to the first embodiment.

Therefore, the second plug power reception coil 40 interlinks with the alternating magnetic field of the first plug power transmission coil 31 to output the induced electromotive force (secondary voltage $V_{2b}$) to the output terminals P7, P8. The induced electromotive force is applied to the second plug power transmission coil 41.

In this case, the second plug power reception coil 40 of the second contactless extension plug 4 is formed to be identical in shape, structure, and size as the first plug power transmission coil 31 of the first contactless extension plug 3 but not in winding number $N_{2b}$. In other words, the magnetic resistance generated by the first plug power transmission coil 31 and the magnetic resistance generated by the second plug power reception coil 40 are the same. A coupling coefficient K2 of the first plug power transmission coil 31 and the second plug power reception coil 40 is, for example, obtained through measurements performed in advance.

The winding number $N_1$, of the first plug power transmission coil 31 and the winding number $N_{2b}$ of the second plug power reception coil 40 are determined. That is, a gain G2 of the second contactless extension plug 4 is determined by determining the winding number $N_1$, and the winding number $N_{2b}$. Thus, the gain G2 is set in advance, and the winding number $N_{1a}$ and the winding number $N_{2b}$ are determined based on $N_{1a}/N_{2b}K2/G2$ (see equation (22)).

The desired secondary voltage $V_{2b}$ ($V_{2b}=G2\cdot V_{2a}=G2\cdot G1\cdot V_1$) is thereby output from the output terminals P7, P8 to the second plug power transmission coil 41.

The second plug power transmission coil 41 is arranged to face the power reception coil 20 of the power receiving device 2 so as to be magnetically coupled thereto. The second plug power transmission coil 41 is wound around a sixth pot type core 44 having the same shape and made of the same material as the second pot type core 25 around which the power transmission coil 20 of the power receiving device 2 is wound. That is, the structure, the shape, and the size of the coils 41, 20 are set the same so that the magnetic resistance generated by the second plug power transmission coil 41 and the magnetic resistance generated by the power reception coil 20 of the power receiving device 2 are the same. The material conditions of the coils 41, 20 may also be the same.

The second plug power transmission coil 41 generates an alternating magnetic field when supplied with a secondary current $I_{2b}$ based on the secondary voltage $V_{2b}$. The frequency of such alternating magnetic field is the same as the frequency f of the alternating magnetic field generated by the power transmission coil 10 of the power supplying device 1.

The alternating magnetic field generated by the second plug power transmission coil 41 interlinks with the power reception coil 20 of the power receiving device 2 magnetically coupled with the second plug power transmission coil 41 so that the induced electromotive force is generated in the power reception coil 20.

In this case, the second plug power transmission coil 41 of the second contactless extension plug 4 is formed to be identical in shape, structure, and size as the power reception coil 20 of the power receiving device 2 but not in winding number $N_{1b}$. In other words, the magnetic resistance generated by the first plug power transmission coil 31 and the magnetic resistance generated by the second plug power reception coil 40 are set the same. A coupling coefficient K of the second plug power transmission coil 41 and the power reception coil 20 is, for example, obtained through measurement carried out in advance.

The winding number $N_{1b}$ of the second plug power transmission coil 41 with respect to the winding number $N_2$ of the power reception coil 20 is determined. That is, the gain G of the power receiving device 2 is determined by determining the winding number $N_{1b}$. Thus, the gain G is set in advance, and the winding number $N_{1b}$ with respect to the winding number $N_2$ is determined based on $N_{1b}/N_2=K/G$ (see equation (22)).

The desired secondary voltage $V_2(=Vout)$, that is, $V_2=Vout=G \cdot V_{2b}=G \cdot G2 \cdot G1 \cdot V_1$ is thereby output to the output terminals P3, P4.

Therefore, if the gains G, G1, G2 are all set to be G=G1=G2=1, the secondary voltage $V_2$ of the power receiving device 2, that is, the output voltage Vout supplied to the load 24 becomes the same as the primary voltage $V_1$ of the power supplying device 1.

Figure 5:
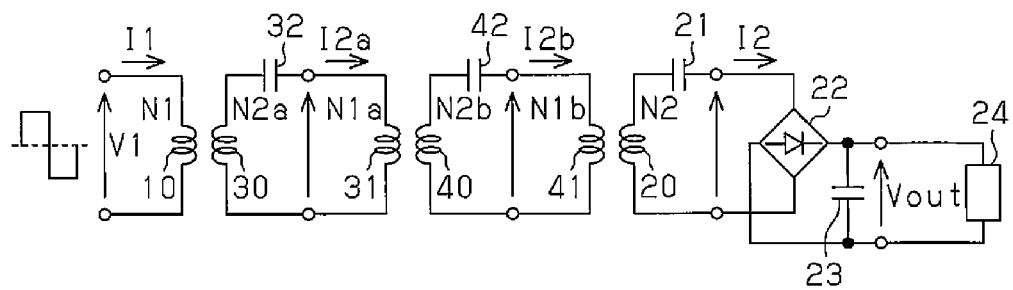
FIG. 5 is an equivalent circuit diagram of an electrical circuit illustrating an electrical configuration of the contactless power supply system of FIG. 4.
Figure 6:
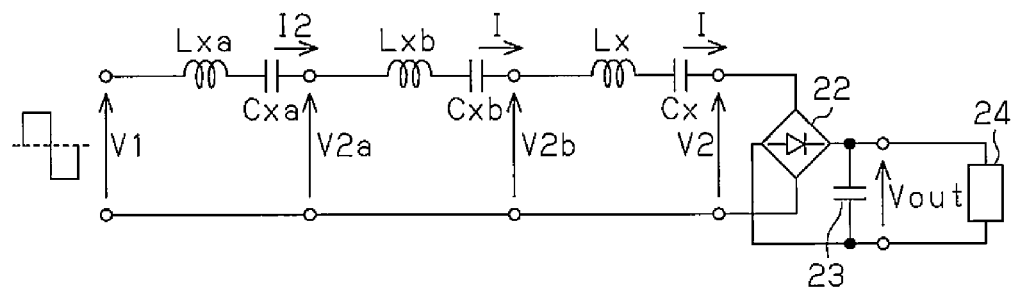
FIG. 6 is an equivalent circuit diagram illustrating an electrical configuration of the contactless power supply system of FIG. 4.
Figure 7:
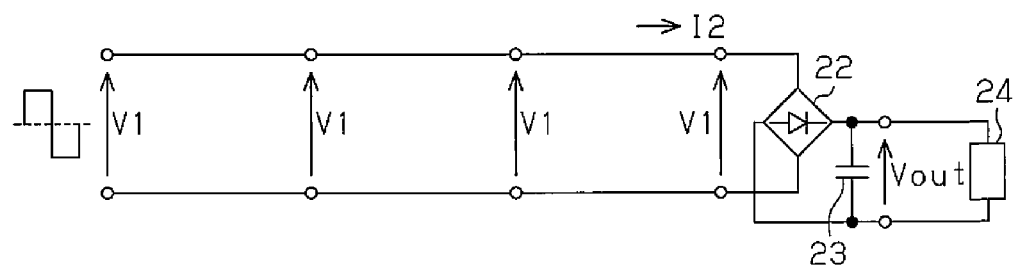
FIG. 7 is an equivalent circuit diagram when the gain is set to one in the contactless power supply system of FIG. 4.

FIGS. 5 and 6 show an equivalent circuit of FIG. 4. FIG. 7 shows an equivalent circuit of when the gains G, G1, G2 are set to G=G1=G2=1.

The first and second contactless extension plugs 3, 4 are referred to as contactless voltage conversion plugs instead of the contactless extension plugs when the gains G1, G2 are other than one. For example, the first contactless extension plug 3 in which the gain G1 is set to G1=2 is referred to as the contactless voltage conversion plug.

Thus, in the second embodiment, the transmission distance of the power can be increased by the first and second contactless extension plugs 3, 4, and the power receiving device 2 can receive power from the power supplying device 1 even if the power supplying device 1 and the power receiving device 2 are greatly spaced apart.

The power supplying device 1 and the first contactless extension plug 3 are formed such that the magnetic resistance of the power transmission coil 10 and the magnetic resistance of the first plug power reception coil 30 become the same. Therefore, the secondary voltage $V_{2a}$, that is, the gain G1 applied to the plug power transmission coil 31 can be easily set by simply setting the winding number $N_1$ of the power transmission coil 10 of the power supplying device 1 and the winding number $N_{2a}$ of the first plug power reception coil 30.

Furthermore, the first and second contactless extension plugs 3, 4 are formed such that the magnetic resistance of the first plug power transmission coil 31 and the magnetic resistance of the second plug power reception coil 40 become the same. Therefore, the secondary voltage $V_{2b}$, that is, the gain G2 applied to the second plug power transmission coil 41 can be easily set by simply setting the winding number $N_1$, of the first plug power transmission coil 31 and the winding number $N_{2b}$ of the second plug power reception coil 40.

Moreover, the second contactless extension plug 4 and the power receiving device 2 are formed such that the magnetic resistance of the second plug power transmission coil 41 and the magnetic resistance of the power reception coil 20 become the same. Therefore, the output voltage Vout, that is, the gain G applied to the load 24 of the power receiving device 2 can be easily set by simply setting the winding number $N_{1b}$ of the second plug power transmission coil 41 and the winding number $N_2$ of the power reception coil 20 of the power receiving device 2.

In the second embodiment, two contactless extension plugs, the first and second contactless extension plugs 3, 4, are arranged between the power supplying device 1 and the power receiving device 2. Instead, one or three or more contactless extension plugs may be arranged.

Third Embodiment

A third embodiment of a contactless power supply system will now be described.

In the third embodiment, an example in which one contactless extension plug described in the second embodiment is used will be described. For the sake of convenience, description will be made assuming the contactless extension plug of the third embodiment is the first contactless extension plug 3, and the same reference characters and the like will be used in the third embodiment.

Figure 8:
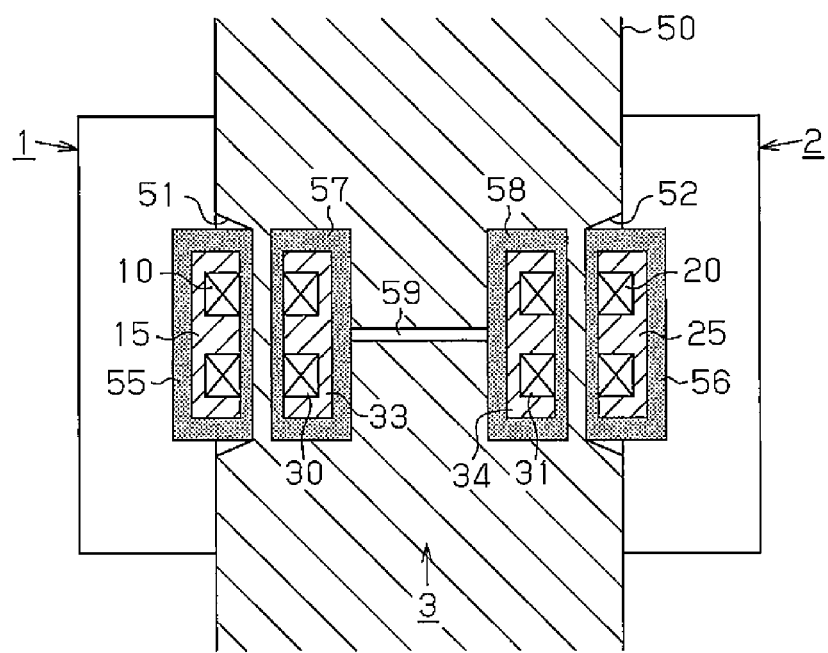
FIG. 8 is a layout diagram of a contactless extension plug illustrating a third embodiment of a contactless power supply system.

As shown in FIG. 8, a power transmission outlet 51 and a power reception outlet 52 are arranged on both sides of a thick wall 50. The power supplying device 1 and the power receiving device 2 are arranged with a wall 50 in between.

The power supplying device 1 includes a power supplying plug 55 formed by winding the power transmission coil 10 around the first pot type core 15. The power supplying plug 55 is attached in a removable manner to the power transmission outlet 51.

The power receiving device 2 includes a power receiving plug 56 formed by winding the power reception coil 20 around the second pot type core 25. The power receiving plug 56 is attached in a removable manner to the power reception outlet 52.

The contactless extension plug 3 is arranged in the wall 50. The contactless extension plug 3 includes the plug power reception coil 30, the plug power transmission coil 31, and the plug resonance capacitor (not shown), where the plug resonance capacitor is connected in series between the plug power reception coil 30 and the plug power transmission coil 31 to configure a closed circuit.

The plug power reception coil 30 is wound around the third pot type core 33, and a housing 57 interiorly attached with the plug power reception coil 30 is arranged on an inner bottom side of the power transmission outlet 51. When the power supplying plug 55 of the power supplying device 1 is attached to the power transmission outlet 51, the plug power reception coil 30 wound around the third pot type core 33 is arranged to face the power transmission coil 10 wound around the first pot type core 15. Therefore, at the time of the attachment of the plug power reception coil 30, the relative positional relationship of the plug power reception coil 30 and the power transmission coil 10 always remains the same, and the coupling coefficient K1 is always the same.

The plug power transmission coil 31 is wound around the fourth pot type core 34, and a housing 58 including the plug power transmission coil 31 therein is arranged on an inner bottom side of the power reception outlet 52. When the power receiving plug 56 of the power receiving device 2 is attached to the power reception outlet 52, the plug power transmission coil 31 wound around the fourth pot type core 34 is arranged to face the power reception coil 20 wound around the second pot type core 25. Therefore, when the plug power transmission coil 31 is attached, the relative positional relationship of the plug power transmission coil 31 and the power reception coil 20 always remain in the same state, and the coupling coefficient K is always the same.

In the wall 50, the plug power reception coil 30 and the plug power transmission coil 31 are connected with a coaxial cable 59 serving as a connecting wire, and the plug resonance capacitor (not shown) is connected in series to either one of the plug power reception coil 30 and the plug power transmission coil 31 to configure a closed circuit.

Thus, in the third embodiment, even if the power supplying device 1 and the power receiving device 2 are separated by the thick wall 50, the power receiving device 2 can receive power from the power supplying device 1 by means of the contactless extension plug 3.

Furthermore, the secondary voltage $V_{2a}$ applied to the plug power transmission coil 31, that is, the gain G1 of the contactless extension plug 3 can easily be set by setting the winding number $N_{2a}$ of the plug power reception coil 30 and the winding number $N_1$ of the power transmission coil 10 of the power supplying device. Furthermore, the output voltage Vout applied to the load 24 of the power receiving device 2, that is, the gain G of the power receiving device 2 can easily be set by setting the winding number $N_{1a}$ of the plug power transmission coil 31 and the winding number $N_2$ of the power reception coil 20 of the power receiving device 2.

Figure 9:
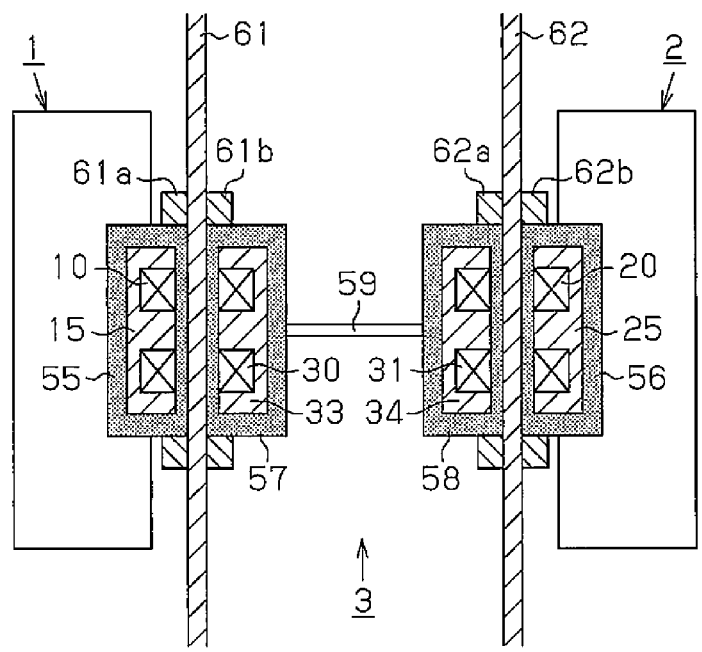
FIG. 9 is a layout diagram of a contactless extension plug illustrating another example of the third embodiment.

In the third embodiment, the contactless extension plug 3 is arranged inside the thick wall 50, and the plug power reception coil 30 and the plug power transmission coil 31 are electrically connected with the coaxial cable 59. Instead, if two insulating plates, first and second insulating plates 61, 62, are arranged in parallel with a constant spacing, as shown in FIG. 9, the contactless extension plug 3 may be arranged between the first and second insulating plates 61, 62 to supply the power from the power supplying device 1 to the power receiving device 2.

In this case, a first coupling member 61a and a second coupling member 61b are arranged on both side surfaces of the first insulating plate 61. The power supplying plug 55 accommodates the power transmission coil 10 of the power supplying device 1 and is fitted and attached to the first coupling member 61a, so that the first coupling member 61a supports, in a removable manner, the power supplying plug 55 on the first insulating plate 61.

The second coupling member 61b is arranged at a position facing the first coupling member 61a with the first insulating plate 61 in between. The housing 57 accommodates the power reception coil 30 of the contactless extension plug 3 and is fitted and attached to the second coupling member 61b so that the second coupling member 61b, in a removable manner, supports the housing 57 on the first insulating plate 61. Therefore, the relative positional relationship of the plug power reception coil 30 and the power transmission coil 10 always remains the same, and the coupling coefficient K is always the same.

A first coupling member 62a and a second coupling member 62b are arranged on both side surfaces of the second insulating plate 62. The housing 58 accommodates the power transmission coil 31 of the contactless extension plug 3 and is fitted and attached to the first coupling member 62a so that the first coupling member 62a supports, in a removable manner, the housing 58 on the second insulating plate 62.

The second coupling member 62b is arranged at a position facing the first coupling member 62a with the second insulating plate 62 in between. The power receiving plug 56 accommodates the power reception coil 20 of the power receiving device 2 and is fitted and attached to the second coupling member 62b so that the second coupling member 62b supports, in a removable manner, the power receiving plug 56 on the second insulating plate 62. Therefore, the relative positional relationship of the plug power transmission coil 31 and the power reception coil 20 always remains the same, and the coupling coefficient K is always the same.

Figure 10:
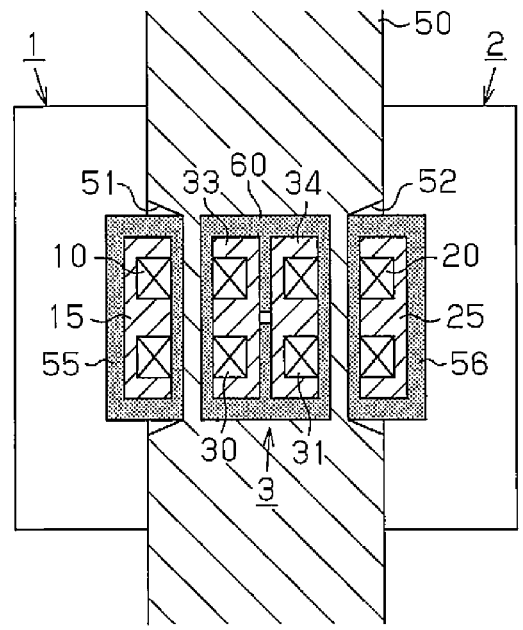
FIG. 10 is a layout diagram of a contactless extension plug illustrating another example of the contactless power supply system.

In the third embodiment, the contactless extension plug 3 is arranged inside the thick wall 50, and the plug power reception coil 30 and the plug power transmission coil 31 are electrically connected to the long coaxial cable 59. Instead, the coaxial cable 59 does not have to be used and the contactless extension plug 3 may be embedded inside the wall 50, as shown in FIG. 10. In this case, the plug power reception coil 30 wound around the third pot type core 33 and the plug power transmission coil 31 wound around the fourth pot type core 34 are accommodated in one housing 60. In accordance with the thickness of the wall 50, the plug power reception coil 30 and the plug power transmission coil 31 are arranged proximate to each other back to back. In this case, a magnetic shield film or an electromagnetic shield film is located between the plug power reception coil 30 and the plug power transmission coil 31.

Figure 11:
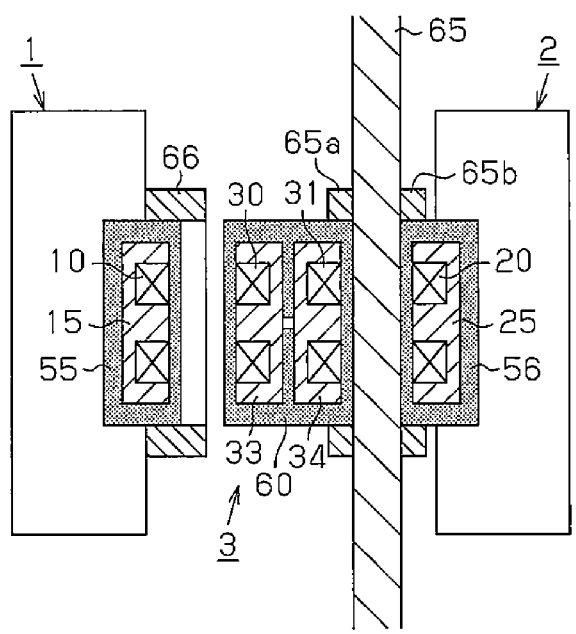
FIG. 11 is a layout diagram of a contactless extension plug illustrating another example of the contactless power supply system.

The contactless extension plug 3 of FIG. 10 in which the plug power reception coil 30 and the plug power transmission coil 31 are proximately arranged back to back may be used coupled to a first coupling member 65a arranged on one side surface of one insulating plate 65, as shown in FIG. 11. The housing 60 of the contactless extension plug 3 is fitted and attached to the first coupling member 65a, and is supported, in a removable manner, on the insulating plate 65.

A second coupling member 65b is arranged at a position facing the first coupling member 65a with the insulating plate 65 located in between on the other side surface of the insulating plate 65. The power receiving plug 56 accommodates the power reception coil 20 of the power receiving device 2 and is fitted and attached to the second coupling member 65b so that the second coupling member 65b supports and fixes, in a removable manner, the power receiving plug 56 to the second insulating plate 62. Therefore, the relative positional relationship of the plug power transmission coil 31 and the power reception coil 20 always remains the same, and the coupling coefficient K is always the same.

A third coupling member 66 is arranged in a peripheral portion of the power supplying plug 55 of the power supplying device 1. The housing 60 of the contactless extension plug 3 can be fitted and attached to the third coupling member 66. The third coupling member 66 supports, in a removable manner, the power supplying device 1 (power supplying plug 55) on the contactless extension plug 3. Therefore, the relative positional relationship of the plug power reception coil 30 and the power transmission coil 10 always remains the same, and the coupling coefficient K is always the same.

Figure 12:
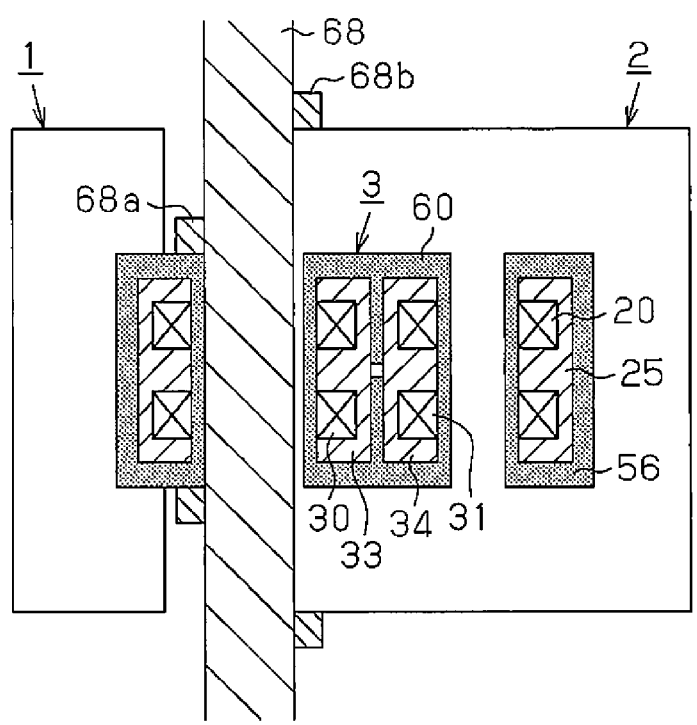
FIG. 12 is a layout diagram of the contactless extension plug illustrating another example of the contactless power supply system.

In the third embodiment, the contactless extension plug 3 is formed separate from the power supplying device 1 and the power receiving device 2 but may be incorporated in the housing of the power receiving device 2, as shown in FIG. 12. In FIG. 12, the power supplying device 1 is coupled to an insulating plate 68 by way of a first coupling plate 68a, and the power receiving device 2 is coupled to the insulating plate 68 by way of a second coupling plate 68b.

Figure 13:
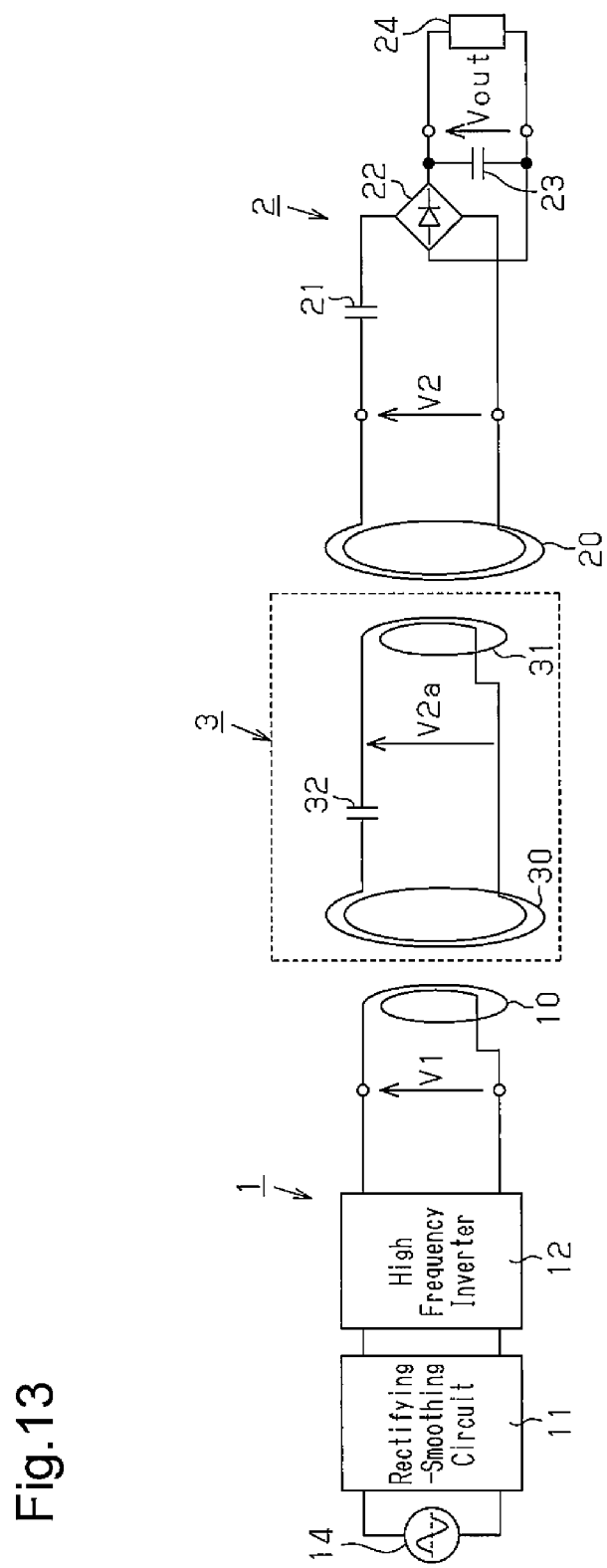
FIG. 13 is an electrical circuit diagram illustrating another example of the contactless power supply system.
Figure 14:
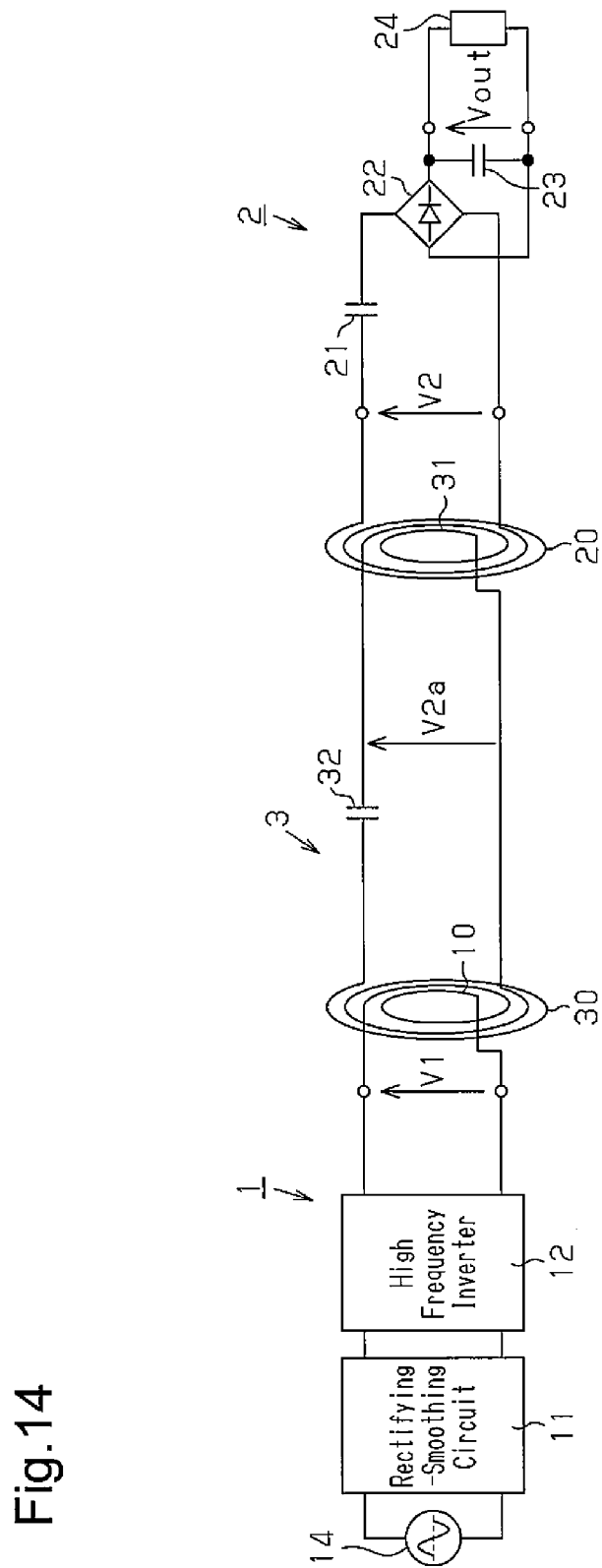
FIG. 14 is an electrical circuit diagram illustrating another example of the contactless power supply system.

In each of the embodiments described above, the diameters of the two coils arranged facing each other are the same. As shown in FIG. 13, for example, the coil diameter of the power transmission coil 10 may be small and the coil diameter of the first plug power reception coil 30 may be large, and the coil diameter of the first plug power transmission coil 31 may be small and the coil diameter of the power reception coil 20 may be large. In this case, as shown in FIG. 14, the power transmission coil 10 having a small coil diameter may be interleaved in and magnetically coupled to the first plug power reception coil 30 having a large coil diameter. In the same manner, the first plug power transmission coil 31 having a small coil diameter may be interleaved in and magnetically coupled to the power reception coil 20 having a large coil diameter.

Furthermore, in each embodiment described above, each coil is wound around a pot type core, which is a magnetic body core. However, each coil does not have to be wound around the magnetic body core.

In the contactless power supply system of each embodiment described above, the power supplying side circuit (power supply side) connected to the power transmission coil 10 may be switched to the power receiving side circuit (load side), and the power receiving side circuit (load side) connected to the power reception coil 20 may be switched to the power supplying side circuit (power supply side) to enable bidirectional power transmission.

FIGS. 15A and 15B show an example of the bidirectional contactless power supply system. In such a system, the terminals P1 to P4 are used as input/output terminals. The terminals P1, P2 (i.e., power transmission coil 10) are selectively connected to either one of a power supplying side circuit 1A shown in FIG. 15A and a power receiving side circuit 2B shown in FIG. 15B. The power supplying side circuit 1A includes the AC power supply 14, the rectifying-smoothing circuit 11, and the high frequency inverter 12. The power receiving side circuit 2B includes a full-wave rectifying circuit 220, the smoothing capacitor 23, and a load 240. The switching of the power supplying side circuit 1A and the power receiving side circuit 2B at the positions of the terminals P1, P2 is performed, for example, by a switch circuit (not shown).

In the same manner, the terminals P3, P4 (i.e., power reception coil 20) are selectively connected to either one of a power receiving side circuit 2A shown in FIG. 15A and a power supplying side circuit 1B shown in FIG. 15B. The power receiving side circuit 2A includes the full-wave rectifying circuit 22, the smoothing capacitor 23, and the load 24. The power supplying side circuit 1B includes an AC power supply 140, a rectifying-smoothing circuit 110, and a high frequency inverter 120. The switching of the power receiving side circuit 2A and the power supplying side circuit 1B at the positions of the terminals P3, P4 is performed, for example, by a switch circuit (not shown).

As shown in FIG. 15A, when the terminals P1, P2 are connected to the power supplying side circuit 1A, the terminals P3, P4 are connected to the power receiving side circuit 2A. In this case, the contactless power supply system of FIG. 1 is formed, and the power is transmitted from the power transmission coil 10 (first power transmission coil) to the power reception coil 20 (first power reception coil) based on the AC power supply 14 serving as a first main power supply.

As shown in FIG. 15B, when the terminals P1, P2 are connected to the power receiving side circuit 2B, the terminals P3, P4 are connected to the power supplying side circuit 1B. In this case, the power reception coil 20 functions as the power transmission coil (second power transmission coil) and the power transmission coil 10 functions as the power reception coil (second power reception coil). The power is transmitted from the second power transmission coil (20) to the second power reception coil (10) based on the AC power supply 140 serving as a second main power supply. That is, in the contactless power supply system shown in FIG. 15B, power is transmitted in the opposite direction from the power transmitting direction shown in FIG. 15A. Thus, the bidirectional contactless power supply system is realized by switching the power supplying side circuit and the power receiving side circuit at the positions of the terminals P1, P2 and the positions of the terminals P3, P4.

FIGS. 16A and 16B show another example of the bidirectional contactless power supply system. Such a system corresponds to the configuration of FIG. 4, and includes the first and second contactless extension plugs 3, 4. In the same manner as described above, the terminals P1 to P4 are used as input/output terminals, and the terminals P1, P2 (i.e., power transmission coil 10) is selectively connected to either one the power supplying side circuit 1A shown in FIG. 16A and the power receiving side circuit 2B shown in FIG. 16B, and the terminals P3, P4 (i.e., power reception coil 20) are selectively connected to either one of the power receiving side circuit 2A shown in FIG. 16A and the power supplying side circuit 1B shown in FIG. 16B. The switching of the power supplying side circuit 1A and the power receiving side circuit 2B at the positions of the terminals P1, P2 and the switching of the power receiving side circuit 2A and the power supplying side circuit 1B at the positions of the terminals P3, P4 are performed, for example, by the switch circuit (not shown).

In this manner, even in the contactless power supply system using the first and second contactless extension plugs 3 and 4, bidirectional power transmission is enabled by selectively connecting either one of the power supplying side circuit and the power receiving side circuit to each coil 10, 20. Although not shown in the drawings, bidirectional power transmission is also enabled in the contactless power supply system that uses a single contactless extension plug by performing the switching of the power supplying side circuit and the power receiving side circuit in the same manner as described above.

In the contactless power supply system of each embodiment described above, the resonance capacitor 21 is connected in series to the power reception coil 20. However, instead of or in addition to such a configuration, the resonance capacitor may be connected in series to the power transmission coil 10. Furthermore, in the contactless power supply system of the second embodiment described above (see FIG. 4), the contactless extension plugs 3, 4 include the resonance capacitors 32, 42, respectively. However, the contactless extension plug does not have to include the resonance capacitor.

Figure 17:
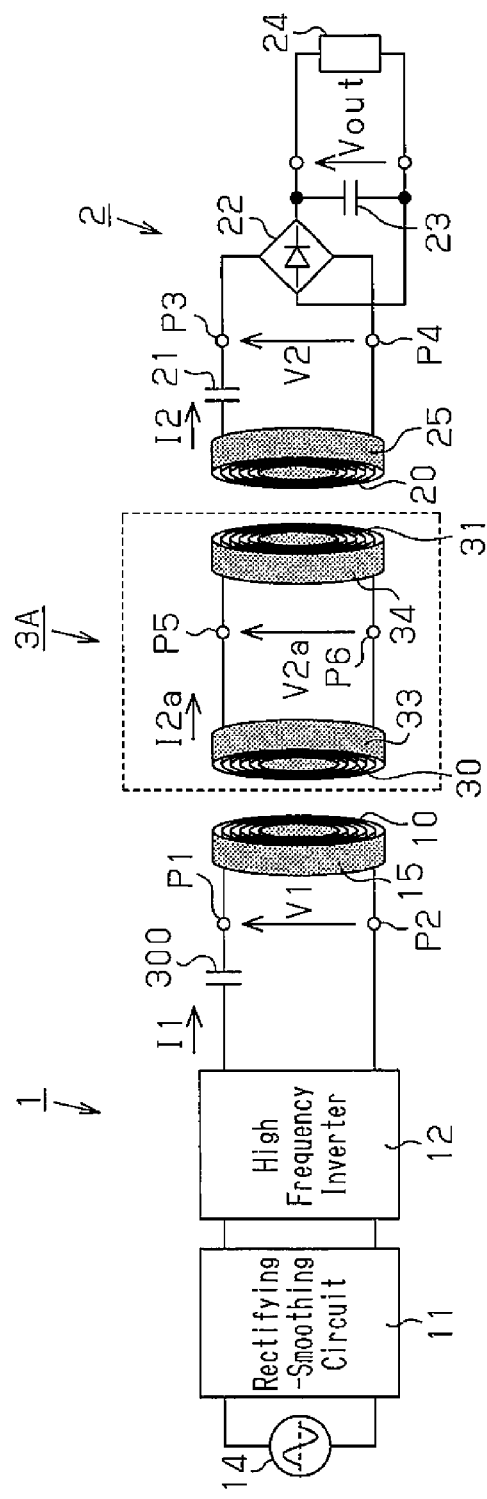
FIG. 17 is an electrical circuit diagram illustrating a modification of the contactless power supply system of FIG. 4.

FIG. 17 shows a modification of the contactless power supply system of FIG. 4. Such a contactless power supply system includes one contactless extension plug 3A. However, the contactless extension plug 3A does not include the resonance capacitor. In the power receiving device 2, the resonance capacitor 21 is connected in series to the power reception coil 20 to configure the series circuit. Further, in a power transmitting device 1, a resonance capacitor 300 is connected in series to the power transmission coil 10 to configure a series circuit. Thus, the technical concept of each embodiment described above may be applied even to a configuration in which the resonance capacitors 300, 21 are arranged only in the power transmitting device 1 and the power receiving device 2, and a resonance capacitor is not arranged in the contactless extension plug 3A. In such a configuration, the contactless extension plug 3A does not include the resonance capacitor. Thus, the contactless extension plug 3A can be miniaturized. The number of contactless extension plugs arranged between the power supplying device 1 and the power receiving device 2 may be two or more, in which case, each contactless extension plug may not include the resonance capacitor.

Figure 18:
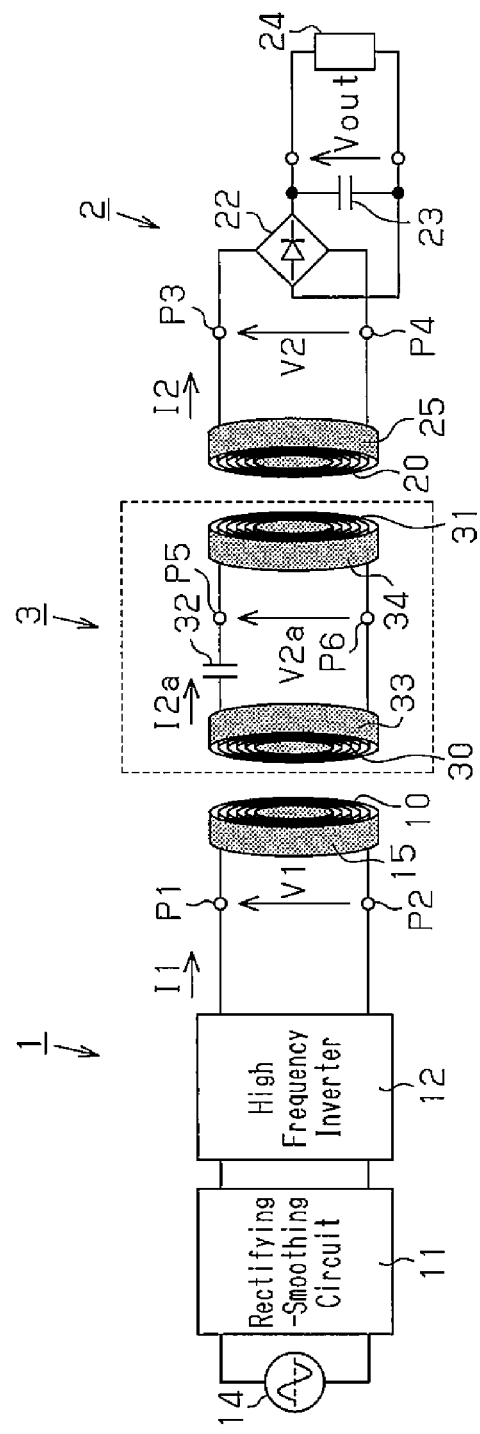
FIG. 18 is an electrical circuit diagram showing another modification of the contactless power supply system of FIG. 4.

FIG. 18 shows a modification of the contactless power supply system of FIG. 4. Such a contactless power supply system includes one contactless extension plug 3, and the contactless extension plug 3B includes a resonance capacitor (i.e., similar to FIG. 4). However, the resonance capacitor is not arranged in the power transmitting device 1 and the power receiving device 2. Thus, the technical concept of each embodiment described above can be applied even to a configuration in which the resonance capacitor 32 is arranged only in the contactless extension plug 3 and a resonance capacitor is not arranged in the power transmitting device 1 and the power receiving device 2. In such a configuration, the power transmitting device 1 and the power receiving device 2 do not include a resonance capacitor. Thus, the power transmitting device 1 and the power receiving device 2 can be miniaturized. The number of contactless extension plugs arranged between the power supplying device 1 and the power receiving device 2 may be two or more, in which case, each contactless extension plug may include a resonance capacitor. Alternatively, at least one of the two or more contactless extension plugs may include the resonance capacitor.

DESCRIPTION OF REFERENCE CHARACTERS

1: power supplying device
2: power receiving device
3: first contactless extension plug
4: second contactless extension plug
10: power transmission coil
11: rectifying-smoothing circuit
12: high frequency inverter
14: AC power supply (main power supply)
15: first pot type core
20: power reception coil
21: resonance capacitor
22: full-wave rectifying circuit
23: smoothing capacitor
24: load
25: second pot type core
30: first plug power reception coil
31: first plug power transmission coil
32: first plug resonance capacitor
33: third pot type core
34: fourth pot type core
40: second plug power reception coil
41: second plug power transmission coil
42: second plug resonance capacitor
43: fifth pot type core
44: sixth pot type core
50: wall
51: power transmission outlet
52: power reception outlet
55: power supplying plug
56: power receiving plug
57, 58: housing
59: coaxial cable (connecting wire)
60: housing
61, 62: first and second insulating plates
61a, 61b: first and second coupling members
62a, 62b: first and second coupling members
65: coupling plate
65a, 65b: first and second coupling members
66: third coupling member
K: coupling coefficient
M: mutual inductance
$L_1$, $L_2$: self-inductance
$V_1$: primary voltage (application voltage)
$V_2$, $V_{2a}$, $V_{2b}$: secondary voltage (application voltage Vout: output voltage
$N_1$, $N_{1a}$, $N_{1b}$, $N_2$, $N_{2a}$, $N_{2b}$: winding number

The invention claimed is:
1. A contactless power supply system comprising:
a power supplying device;
a power receiving device; and
a contactless extension plug arranged between the power supplying device and the power receiving device, wherein the contactless extension plug supplies power from the power supplying device to the power receiving device through electromagnetic induction;
wherein the power supplying device includes
a first high frequency inverter, which generates a high frequency current based on a first main power supply, and
a first power transmission coil, which is supplied with the high frequency current;
the contactless extension plug includes
a plug power reception coil that interlinks with an alternating magnetic field formed by the first power transmission coil and generates an induced electromotive force,
a first resonance capacitor connected in series to the plug power reception coil to produce series resonance, wherein the first resonance capacitor has a capacitance set to cancel secondary leakage inductance at the plug power reception coil, and
a plug power transmission coil connected to a series circuit of the plug power reception coil and the first resonance capacitor;
the power receiving device includes
a first power reception coil that interlinks with an alternating magnetic field formed by the plug power transmission coil to generate an induced electromotive force, and
a second resonance capacitor connected in series to the first power reception coil to produce series resonance, wherein the second resonance capacitor has a capacitance set to cancel secondary leakage inductance at the first power reception coil;
the power receiving device supplies power to a first load based on a voltage generated by the first power reception coil in accordance with a voltage applied to the plug power transmission coil;
the first power transmission coil and the plug power reception coil are identical with each other in shape, structure, and size but not in winding number;
the first power transmission coil and the plug power reception coil are configured to satisfy a relational equation of

$$(L_{2a}/L_1)^{1/2}=G1/K1=N_{2a}/N_1,$$

where $L_1$ represents a self-inductance of the first power transmission coil, $L_{2a}$ represents a self-inductance of the plug power reception coil, $N_1$ represents a winding number of the first power transmission coil, $N_{2a}$ represents a winding number of the plug power reception coil, K1 represents a coupling coefficient of the first power transmission coil and the plug power reception coil, and G1 represents a voltage conversion gain of the voltage applied to the plug power transmission coil relative to the voltage applied to the first power transmission coil;
the plug power transmission coil and the first power reception coil are identical with each other in shape, structure, and size but not in winding number; and the plug power transmission coil and the first power reception coil are configured to satisfy a relational equation of $$(L_2/L_{1a})^{1/2}=G2/K2=N_2/N_{1a},$$

where $L_{1a}$ represents a self-inductance of the plug power transmission coil, $L_2$ represents a self-inductance of the first power reception coil, $N_{1a}$ represents a winding number of the plug power transmission coil, $N_2$ represents a winding number of the first power reception coil, K2 represents a coupling coefficient of the plug power transmission coil and the plug power reception coil, and G2 represents a voltage conversion gain of the voltage applied to the first power reception coil relative to the voltage applied to the plug power transmission coil.

2. The contactless power supply system according to claim 1, further comprising:
a second high frequency inverter that generates a high frequency current based on a second main power supply;
wherein the first power reception coil is selectively connectable to either one of the second high frequency inverter and the first load;
the first power transmission coil is selectively connectable to either one of the first high frequency inverter and a second load; and
when the first power reception coil is connected to the second high frequency inverter and the first power transmission coil is connected to the second load, the first power reception coil functions as a second power transmission coil and the first power transmission coil functions as a second power reception coil.

3. A contactless extension plug that supplies power from a power transmission coil of a preceding stage to a power reception coil of a subsequent stage, the contactless extension plug comprising:
a plug power reception coil arranged facing the power transmission coil of the preceding stage;
a plug power transmission coil arranged facing the power reception coil of the subsequent stage; and
a resonance capacitor connected in series between the plug power reception coil and the plug power transmission coil to configure a closed circuit;
wherein the resonance capacitor has a capacitance set to cancel secondary leakage inductance at the plug power reception coil;
the plug power reception coil interlinks with an alternating magnetic field formed by the power transmission coil of the preceding stage to generate an induced electromotive force, the plug power transmission coil forms an alternating magnetic field based on the induced electromotive force generated by the plug power reception coil, and the power reception coil of the subsequent stage interlinks with the alternating magnetic field formed by the plug power transmission coil to generate an induced electromotive force;
the power transmission coil of the preceding stage and the plug power reception coil are identical with each other in shape, structure, and size but not in winding number;
the power transmission coil of the preceding stage and the plug power reception coil are configured to satisfy a relational equation of $$(L_{2a}/L_1)^{1/2}=G1/K1=N_{2a}/N_1,$$

where $L_1$ represents a self-inductance of the power transmission coil of the preceding stage, $L_{2a}$ represents a self-inductance of the plug power reception coil, $N_1$ represents a winding number of the power transmission coil of the preceding stage, $N_{2a}$ represents a winding number of the plug power reception coil, K1 represents a coupling coefficient of the power transmission coil of the preceding stage and the plug power reception coil, and G1 represents a voltage conversion gain of the voltage applied to the plug power transmission coil relative to the voltage applied to the power transmission coil of the preceding stage;
the plug power transmission coil and the power reception coil of the subsequent state are identical with each other in shape, structure, and size but not in winding number; and
the plug power transmission coil and the power reception coil of the subsequent stage are configured to satisfy a relational equation of $$(L_2/L_{1a})^{1/2}=G2/K2=N_2/N_{1a},$$

where $L_{1a}$ represents a self-inductance of the plug power transmission coil, $L_2$ represents a self-inductance of the power reception coil of the subsequent stage, $N_{1a}$ represents a winding number of the plug power transmission coil, $N_2$ represents a winding number of the power reception coil of the subsequent stage, K2 represents a coupling coefficient of the plug power transmission coil and the power reception coil of the subsequent stage, and G2 represents a voltage conversion gain of the voltage applied to the power reception coil of the subsequent stage relative to the voltage applied to the plug power transmission coil.

4. The contactless extension plug according to claim 3, wherein at least one of the voltage conversion gain G1 and the voltage conversion gain G2 is set to one.

5. The contactless extension plug according to claim 3, wherein the power transmission coil of the preceding stage is a power transmission coil of a power supplying device, and a high frequency current generated by a high frequency inverter of the power supplying device based on power from a main power supply is supplied to the power transmission coil of the power supplying device.

6. The contactless extension plug according to claim 3, wherein the power reception coil of the subsequent stage is a power reception coil of a power receiving device, the power reception coil of the power receiving device interlinks with an alternating magnetic field formed by the plug power transmission coil to generate an induced electromotive force, and an output voltage is supplied to a load based on the induced electromotive force generated by the power reception coil.

7. The contactless extension plug according to claim 3, wherein the plug power reception coil and the plug power transmission coil are accommodated in different housings and are arranged spaced apart by way of a connecting wire.

8. The contactless extension plug according to claim 3, wherein the plug power reception coil and the plug power transmission coil are accommodated in the same housing and are arranged at positions proximate to each other.

9. The contactless power supply system according to claim 1, wherein at least one of the voltage conversion gain G1 and the voltage conversion gain G2 is set to one.

* * * * *